United States Patent Office 3,114,750
Patented Dec. 17, 1963

3,114,750
3 - ENOL ETHERS OF 6 - FORMYL - 3 - OXO-Δ⁴-STEROIDS AND PROCESS FOR THEIR PREPARATION
David Neville Kirk and Vladimir Petrow, both of London, England, assignors to The British Drug Houses Limited
No Drawing. Filed Nov. 6, 1961, Ser. No. 150,140
Claims priority, application Great Britain Nov. 7, 1960
33 Claims. (Cl. 260—239.55)

This invention is for improvements in or relating to organic compounds and has particular reference to steriodal materials containing an additional carbon substituent at $C_6$.

It is an object of the present invention to provide a new and general process for the preparation of a new series of steroidal products which may be regarded structurally as the 3-enol ethers of 6-formyl-3-oxo-Δ⁴-steroids.

We have made the surprising discovery that the 3-enolic ethers of 3-oxo-Δ⁴-steroids may be converted by the process of this invention into the corresponding 6-formyl derivatives. This is a discovery of outstanding importance in the field of steroid technology. Many of the herein described derivatives possess valuable biological properties which render them of value in, for example, the veterinary field. Thus, for example, the derivatives of 17β-hydroxyandrostane which fall within the scope of the present invention may possess anabolic, androgenic and claudogenic properties. The derivatives of 17α-acyloxypregnan-20-one which fall within the scope of the present invention may possess progestational properties when administered by the oral route. The derivatives of 16α,17α-isopropylidenedioxypregnan-20-one may likewise show progestational activity as well as claudogenic activity. Claudogenic activity will, in general, also be shown by derivatives of 9α-fluoropregnan-11β,17α,21-trihydroxy-20-one, 17α,21-dihydroxypregnane-11,20-dione, 11β,17α,21-trihydroxypregnane-20-one and by the 21-acyl and 17,21-diacyl derivatives thereof. In addition, such compounds may show glucocorticoid activity.

The compounds of the present invention form exceptionally convenient intermediates for the preparation of the therapeutically valuable 6α-methyl steroidal hormones of the androstane and pregnane series, which compounds are now well-known in clinical practice, and into which they may be converted by reduction to 6-hydroxymethyl derivatives, followed by treatment with H⁺ ions, when conversion into the corresponding 6-methylene-3-oxo-Δ⁴-steroids takes place. The last group of compounds, on catalytic hydrogenation followed by treatment with very dilute ethanolic hydrochloric acid or potassium hydroxide, yield the corresponding 6α-methyl-3-oxo-Δ⁴-steroids. In addition the products of the present invention represent entirely new types of steroidal materials which themselves possess intrinsic value as "building blocks" for other types of steroidal materials containing a $C_6$ carbon substituent. Thus, for example, they may be expected to react with a variety of reagents such as the halogens, peracids, and to undergo hydrogenation. The numerous possibilities for reaction possessed by the products of the present invention will be apparent to those skilled in the art.

It is a further object of the present invention to provide pharmaceutical preparations of the biologically active materials.

The present invention provides new 3-enol ethers of 6-formyl-3-oxo-Δ⁴-steroids including the Formula II below.

The invention also provides the following new products:

21-acetoxy-6-formyl-17α-hydroxy-3-methoxypregna-3,5-diene-11,20-dione
21-acetoxy-11β-formoxy-6-formyl-17α-hydroxy-3-methoxypregna-3,5-dien-20-one
21-acetoxy-11β-hydroxy-6-formyl-17α-hydroxy-3-methoxypregna-3,5-dien-20-one
17α,21-diacetoxy-6-formyl-3-methoxy-pregna-3,5-dien-11,20-dione
21-acetoxy-3-ethoxy-6-formyl-17α-hydroxypregna-3,5-diene-11,20-dione
21-acetoxy-6-formyl-17α-hydroxy-3-(2'-hydroxyethoxy) pregna-3,5-dien-11,20-dione which are of value on account of their claudogenic activity.

17α,21-dihydroxy-6-formyl-3-methoxypregna-3,5-diene-11,20-dione, 17,21-acetonide, and 17,21-orthoformate derivative
17α,21-dihydroxy-3-ethoxy-6-formylpregna-3,5-diene-11,20-dione 17,20,20,21-bismethylenedioxy derivative which are of value as intermediates for the preparation of the corresponding corticoid derivatives into which they may be converted by reduction to 6-hydroxymethyl derivatives, treatment with H⁺ ions, catalytic hydrogenation and acid hydrolysis.

21-acetoxy-17α-hydroxy-3-methoxy-6-formylpregna-3,5,9(11)-trien-20-one
21-acetoxy-6-formyl-3-methoxypregna-3,5,17(20)-trien-11-one which are of value as intermediates for the preparation of the corresponding corticoidal types into which they may be converted as described above or by methods of prior art.

17α-acetoxy-21-fluoro-6-formyl-3-methoxypregna-3,5-dien-20-one
17α-acetoxy-6-formyl-3-methoxy-16α-methylpregna-3,5-dien-20-one
17α-acetoxy-16-ethylidene-6-formyl-3-methoxypregna-3,5-dien-20-one
17α-acetoxy-6-formyl-3-methoxy-16-methylenepregna-3,5-dien-20-one
17α-acetoxy-6-formyl-3-methoxypregna-3,5-dien-20-one which are of value on account of their progestational properties upon oral administration.

6-formyl-3-methoxy - 16α,17α - cyclomethylenepregna-3,5-dien-20-one which is of value on account of its claudogenic properties.

21-benzylidene-3-ethoxy-6-formyl-16α,17α-isopropylidenedioxypregna-3,5-dien-20-one
3-ethoxy-6-formyl-16α,17α-isopropylidenedioxypregna-3,5-dien-20-one which are of value on account of their claudogenic activity. In addition, they possess some progestational activity.

17β-acetoxy-3-ethoxy-6-formylandrosta-3,5-diene
17β-acetoxyethoxy-3-formylandrosta-3,5-diene
17β-acetoxy-3-methoxy-6-formylandrosta-3,5-diene
17β-acetoxy-3-benzyloxy-6-formylandrosta-3,5-diene
17β-acetoxy-3-ethoxy-6-formyl-2α-methylandrosta-3,5-diene
17β-acetoxy-3-ethoxy-6-formyl-19-norandrosta-3,5-diene
17β-acetoxy-3-methoxy-6-formyl-19-norandrosta-3,5-diene which are of value on account of their anabolic and androgenic properties.

The 6-formyl-3-enolmethyl ether of testololactone which is of value in the experimental study of animal tumours.

11α,17β-diacetoxy-6-formyl-3-methoxyandrosta-3,5-diene
6-formyl-3-methoxyandrosta-3,5-dien-17-one
6-formyl-3-benzyloxyandrosta-3,5-dien-17-one
17α-chlorethynyl-17β-formoxy-6-formyl-3-methoxy-androsta-3,5-diene
17β-acetoxy-6-formyl-3-methoxy-17α-methylandrosta-3,5-diene which are of value as intermediates for the preparation of the corresponding 6-methylene and 6-methyl-3-oxo-Δ⁴-steroids into which they may be converted by the methods described above or by the application of methods of prior art.

3-ethoxy-6-formylspirosta-3,5-diene
6-formyl-3-methoxy-16-methylpregna-3,5,16-trien-20-one
6 formyl-17α-hydroxy-3-methoxy-16-methylenepregna-3,5-dien-20-one
3-ethoxy-6-formylpregna-3,5,17(20) trien-21-oic acid ethyl ester
15α-acetoxy-6-formyl-3-methoxypregna-3,5-dien-20-one
16α-cyano-6-formyl-3-methoxypregna-3,5-dien-20-one
16α,17α-epoxy-6-formyl-3-methoxypregna-3,5-dien-20-one which are of value as novel intermediates for the preparation of 6-methylene and 6-methyl-3-oxo-Δ⁴-steroids.

21-acetoxy-3-ethoxy-6-formylpregna-3,5-dien-20-one
21-acetoxy-3-methoxy-6-formylpregna-3,5-dien-20-one
6-formyl-3-methoxypregna-3,5-dien-20-one which are of value on account of their claudogenic activity.

β-[3-ethoxy-6-formyl-17β-hydroxyandrosta-3,5-dien-17α-yl] propionic acid lactone which is of value as an intermediate in the preparation of the corresponding 6α-methyl-3-oxo-Δ⁴-derivative of prior art into which it may be converted by the methods hereinbefore described or by the application of known procedures. The 6-methylated spirolactone is a potent aldosterone antagonist.

According to the present invention there is provided a process for the preparation of 3-enol ethers of 6-formyl-3-oxo-Δ⁴-steroids including the formula

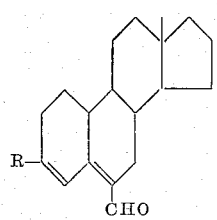

where R=O-alkyl, O-hydroxyalkyl, O-cycloalkyl, O-alkaryl or a functional derivative thereof which process comprises treating a corresponding 3-enol ether of a 3-oxo-Δ⁴-steroid including the formula

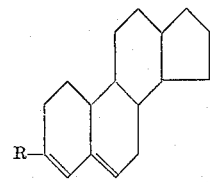

where R has the same meaning as above with a formylating agent which does not modify the conjugated system to yield the 6-formyl derivative.

The formylating agent which does not modify the conjugated system in order to yield the 6-formyl derivative is the Vilsmeier reagent (see for example Houben-Weyl, Methoden der Organische Chemie, 4th ed., 1954, vol. 7 (1), page 29 et seq., Bosshard and Zollinger, Helv. Chim. Acta, 1959, 42, 1659).

The invention also provides a process for the preparation of 6-formyl-3-oxo-Δ⁴-steroids of the androstane and pregnane series including the formula

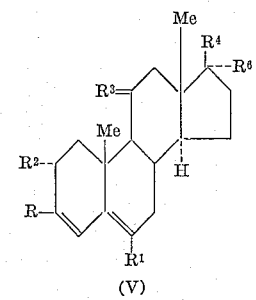 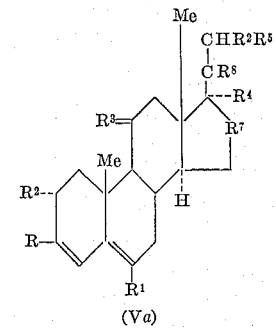

where R¹ is CHO,
R² is H or Me,
R³ is H, HOH or =O,
R⁴ is H, Me, OH or OAcyl (where the acyl group contains up to 10 carbon atoms),
R⁵ is H, R⁴ or F,
R⁶ is H, Me, Et, vinyl, ethynyl, propynyl, chlorethynyl or OH,
R⁷ is CH₂, CHR⁴, C=CH₂, C=CHMe, CH.CH₂OH, CHCN or CHHal where Hal is Cl, Br or F,
R⁴ and R⁷ together form —O.CMe₂.O.CH— or

—O:CH₂—

R⁸ is :O, H(OH) or H(OAcyl),
R⁴ and R⁶ together form .O.CO.CH₂.CH₂ or =O,
R represents part of an enol ether moiety, and the 9(11)-dehydro derivatives thereof which process comprises treating the corresponding enolic 3-substituted 3,5-dienic steroid of the androstane or pregnane series with the Vilsmeier reagent followed by aqueous hydrolysis.

As known to those skilled in the art the condensation of an unsaturated system with the Vilsmeier reagent is generally carried out under essentially anhydrous conditions when an iminium intermediate is obtained, which passes into the required formyl derivative on aqueous hydrolysis. As hereinafter described, the Vilsmeier reagent for the purpose of the present invention is preferably a complex formed from a formamide (e.g. dimethylformamide) and an acidic reagent such as phosphorus oxychloride or phosgene. The reaction is preferably carried out at room temperature or below for example at approximately 0° C.

The Vilsmeier reagent is used by those skilled in the art for introducing the aldehyde group into aromatic, quasiaromatic and certain heterocyclic ring systems. Its application to the steroid field has not hitherto been reported. Its present application to the enolic derivatives of 3-oxo-Δ⁴-steroids represents an important, highly specific and unexpected development of the art as the corresponding 3-enol acetates of 3-oxo-Δ⁴-steroids, as well as 3-ethoxy-Δ⁵-steroids and 3-oxo-Δ⁴-steroids all fail to yield 6-formyl derivatives under the conditions of the present invention.

A particularly surprising feature of the present invention is the successful utilisation of 3-enolic ethers as such 3-enolic ethers are known to be highly unstable in the presence of acidic reagents.

Another surprising feature of the invention is the stability of the resulting 6-formyl 3-enolic derivatives which could not have been predicted by prior art and represents a vital factor in the success of the process of the present invention. Inter alia we have made the surprising discovery that the product (II) of the present invention can undergo ether interchange on prolonged heating with alcohols R'OH in which R' has a lower molecular weight than R. Thus, for example, 3-ethoxy-6-formyl-Δ³,⁵-derivatives (II; R=EtO), on prolonged boiling with methanol undergo ether interchange to yield the corresponding 3-methoxy-6-formyl-Δ³,⁵-derivatives (II; R=MeO)

Enolic ethers [(I) where R is O-alkyl, O-hydroxyalkyl, O-cycloalkyl or O-alkaryl, as well as chemical equivalents thereof such as chloroalkyl or alkoxyalkyl] may be employed as starting materials for the invention. Methyl-, ethyl- and benzyl-ethers (in which R is MeO, EtO and BzO) form the preferred group of starting materials and may be readily prepared from 3-oxo-Δ⁴-steroids by methods well-established by prior art. O-hydroxyalkyl-enol ethers (in which R is HO.CH₂.(CH₂)ₙO) may also be employed and may be prepared in situ from the corresponding 3,3-alkylenedioxy-Δ⁵-derivatives and chemical equivalents thereof in the presence of the Vilsmeier reagent with which they subsequently react to yield the 6-formyl derivatives of the corresponding 2'-hydroxyethyl enol ethers.

*Vilsmeier reagent.*—The Vilsmeier reagent is generally understood to be a reactant formed from a formylated secondary amine and an acid halide selected from the group comprising those acid halides which readily undergo nucleophilic displacement of a halide ion on treatment with the N-formyl derivative of a secondary amine [see, for example, Bosshard and Zollinger, Helv. Chim. Acta, 1959, 42, 1659].

Various formamides such as

Dimethylformamide
Diethylformamide
Methylphenylformamide
Ethylphenylformamide
Formylpiperidine
Formylmorpholine
Methylethylformamide may be employed. As mentioned above dimethylformamide is the preferred formamide.

In addition to phosphorus oxychloride and phosgene, other acidic reagents such as phosphorus oxybromide and pentachloride may be employed. Thionyl chloride, oxalyl chloride and similar acid halides may also be used. Phosgene is the preferred reagent.

*Preferred procedure for preparing 6-formyl derivatives.*—Phosgene (generally about one mole) either directly or in solution in an anhydrous non-hydroxylic organic solvent, which is preferably a halogenated hydrocarbon solvent such as methylene dichloride, chloroform, carbon tetrachloride or ethylene dichloride, is added at 0° C., to a solution of dimethylformamide, preferably in one of the foregoing chlorinated hydrocarbon solvents, when formation of the Vilsmeier reagent occurs. It is preferable at this stage to obtain a reagent free from excess phosgene by ensuring the presence of not less than an equivalent quantity of dimethylformamide and to prepare it under essentially anhydrous conditions. Other organic solvents which can be employed include dioxan, tetrahydrofuran, ether, benzene, toluene, ethyl acetate and trifluorotrichloroethane.

Dimethylformamide can also be used as both solvent and reactant.

The steroidal enol ether, either in solution (preferably in one of the foregoing halogenated solvents) or in the finely-powdered state, is then added at preferably 0° C., to the prepared Vilsmeier reagent. The mixture is preferably stirred, moisture is excluded, and the reaction allowed to proceed spontaneously, when darkening of the solution occurs and the temperature of the mixture rises. In general, in working with small batches of material, external cooling is not necessary, but some cooling may become desirable when the scale of the reaction is increased. Reaction is generally complete in 1 to 2 hours. The resulting "iminium" salt is then decomposed by aqueous hydrolysis and the 6-formyl derivative isolated by extraction or filtration. As will be apparent to those skilled in the art a buffered solution such as aqueous sodium acetate or aqueous methanolic sodium acetate is entirely satisfactory for effecting hydrolysis of the iminium intermediate. Hydrolysis of the iminium intermediate is accompanied by formation of acidic materials (e.g. HCl) which, unless removed by a base or buffer in situ, could react with acid-sensitive groups such as the corticoid side-chains if present in the steroidal materials thereby lowering the yields of 6-formylated products. The use of buffered aqueous solutions for decomposing the iminium intermediates is, of course, unnecessary when steroid materials containing substituents stable to acids are employed. For such materials, water or aqueous acetic acid may be used in place of buffered aqueous solutions if so desired.

In general, ca. 1.1–1.3 molar proportions of Vilsmeier reagent are sufficient in those cases in which the Vilsmeier reagent is wholly utilised for 6-formylation. As will be apparent to those skilled in the art the quantity of Vilsmeier reagent will, in general, have to be increased in those cases or experimental situations in which reactions other than 6-formylation take precedence over or compete with 6-formylation. Thus, for example, as indicated hereinunder, primary, secondary and certain tertiary hydroxyl groups are converted into formoxy groups by the Vilsmeier reagent unless protected for example by acylation or etherification. In general, conversion of such reactive hydroxyl groups into formoxy groups competes with and takes precedence over 6-formylation. Thus reaction of the 3-enolether of testosterone with ca. 1 molar proportion of Vilsmeier reagent leads primarily to the production of the 17-formate. Reaction of the same 3-enol ether of testosterone with ca. 2.5 molar equivalents of Vilsmeier reagent, in contrast, leads to the formation of the 6-formyl derivative of the 17-formate. As primary and secondary formoxy groups, as known by prior art, are very readily hydrolysed, it is possible to effect hydrolysis of the 17-formate residue during the process of isolation of the 6-formyl derivative as described in Example 26. Cortisone 21- acetate enol ethers and similar structures give excellent yields of 6-formyl derivative when treated with ca. 1.6 moles of Vilsmeier reagent. 16α,17α-epoxy groups likewise react with the Vilsmeier reagent (see below) and this point should also be taken into account by those skilled in the art.

*Scope of the 6-formylation reaction.*—The 6-formylation reaction is generally applicable to the enolic derivatives of 3-oxo-Δ⁴-steroids. Thus, for example, it may be successfully applied to derivatives of androstane including androstane, 19-norandrostane, 9β,10α-androstane and more complex derivatives thereof such as cholestane, spirostane, ergostane and stigmastane. Again the 6-formylation reaction may be applied to derivatives of pregnane including pregnane, 19-norpregnane and 9β,10α-pregnane. Such systems may additionally contain further substituents as indicated below:

*Hydroxyl groups.*— The Vilsmeier reagent is known by prior art to formylate or replace by halogen free hydroxyl groups (see Houben-Weyl, loc. cit.). It may be advantageous, therefore, to protect hydroxyl groups by acylation and subsequently regenerate them by hydrolysis or hydrogenolysis if so desired. As formate esters are readily hydrolysed, however, such formylation as may occur during the Vilsmeier reaction, may be reversed by hydrolysis of the formed formate ester.

Thus, in Example 26 is described the 6-formylation of testosterone 3-methyl ether using 2.5 moles of Vilsmeier reagent to give by the process of the example, 6-formyl-3-methoxyandrosta-3,5-dien-17β-ol. Again, by treating the 3-enol ether of cortisone 21-acetate with ca. 1.6 molar proportions of the Vilsmeier reagent, a yield of the 6-formyl derivative which may exceed 80% is obtained without apparently any concomitant reaction of the unesterified 17α-hydroxyl group taking place. The pseudo-equatorially oriented tert. 17β-hydroxy group in compounds such as 17α-methyl-, 17α-chloroethynyl and 17α-propynyl testosterone will, in general, require acylation to prevent its formylation during the Vilsmeier reaction. Hydroxyl groups and functional derivatives thereof in such positions as 11, 12, 16 (including 16-hydroxymethyl), 14, 15, 17, 18, 19, 20 and 21 (including the condensation products of 16α,17α-glycols with carbonyl components), however, generally permit normal formylation at $C_6$ to take place. Thiol groups at $C_{16}$ are unaffected.

*Carbonyl groups.*—Carbonyl groups such, for example, as carbonyl groups at 11, 12, 15, 16, 17, 18 and 20.

*Carbalkoxy groups.*—Carbalkoxy groups at $C_{13}$, $C_{16}$ and $C_{17}$, or in the side-chain. Cyano-groups at $C_{13}$, $C_{16}$ and $C_{17}$ likewise permit normal $C_6$ formylation to occur.

*Alkyl groups.*—Alkyl groups other than at $C_4$ and $C_6$ and in particular methyl groups at $C_2$, $C_{11}$, $C_{16}$, $C_{17}$ and $C_{21}$ and ethyl at $C_{17}$.

*Alkenyl groups.*—Vinyl, allyl, alkynyl and chloroalkynyl as well as propynyl and chloroethynyl groups at $C_{17}$.

*Methylene and ethylidene groups.*—At positions 11, 16 and 17.

Such groups as benzylidene, particularly benzylidene attached to $C_{21}$ do not interfere with the process of the invention. The reaction may also be performed in the presence of 16,17-methylene.

*Lactone, ether and spiroketal residues.*—Spirolactone residues such as —O.CO.CH$_2$.CH$_2$— attached to $C_{17}$, etheric groups at $C_{16}$, and bridging $C_{13}$ and $C_{20}$, spiroketal moieties such as are present in diosgenone, ketalised carbonyl groups for example at $C_{17}$ or $C_{20}$.

*Halogen groups.*—Chlorine, bromine or fluorine substituents in Rings C and D or in the sidechain do not interfere with the process of the invention. In particular the invention may be applied to 9α-, 16 and 21-fluoro-substituted derivatives.

*Unsaturated linkages.*—Unsaturated linkages at $C_{9(11)}$, $C_{11}$, $C_{14}$, $C_{16}$ and $C_{17(20)}$.

*Ketol groups.*—Ketol groups at $C_{16}$–$C_{17}$, $C_{17}$–$C_{20}$ and $C_{20}$–$C_{21}$ are preferably acylated or otherwise protected prior to reaction with the Vilsmeier reagent.

*Corticoid side chain.*—The corticoid side chain may be protected by acylation at $C_{21}$ or at $C_{17}$ and $C_{21}$, by reaction with formaldehyde to give the bismethylenedioxy derivative, by forming the $C_{17}$–$C_{21}$ cyclic carbonate, acetonide or by other methods known to those skilled in the art, and subsequently regenerated as desired.

*Epoxides.* — 16β-methyl-16α,17α-epoxypregnan-20-one derivatives may be converted in one operation into the corresponding 6-formyl derivatives of 17a-hydroxy-16-methylenepregnan-20-one by using approximately 2 molar proportions of the Vilsmeier reagent. 16α,17α-epoxy-pregnan-20-one residues are converted into 16β-halo-17α-hydroxypregnan-20-one structures, but an excess of Vilsmeier reagent over that required by theory is required to force this reaction to completion. The epoxy-group may subsequently be regenerated from the crude halohydrin by reaction with an alkaline reagent such for example, as methanolic sodium hydroxide or by other methods well-established by prior art. The process of the invention may be performed in the presence of bromo, chloro and fluorohydrins, particularly at $C_9$:$C_{11}$ and $C_{16}$:$C_{17}$.

The process of the invention may be used for the 6-formylation of 3-enol ethers (and acyl derivatives thereof) derived from the following steroidal 3-oxo-4-enes.

Testosterone
2-methyltestosterone
17α-methyltestosterone
9(11)-dehydro-17α-methyltestosterone
17α-propynyltestosterone
17α-acyloxyprogesterone
9(11)-dehydro-17α-acyloxyprogesterone
16-methyl-17α-acyloxyprogesterone
9(11)-dehydro-16-methyl-17α-acyloxyprogesterone
16-methylene-17α-acyloxyprogesterone
9(11)-dehydro-16-methylene-17α-acyloxyprogesterone
17α-acyloxy-16-ethylideneprogesterone
16α,17α-dimethylmethylenedioxyprogesterone
9(11)-dehydro-16α,17α-dimethylmethylenedioxyprogesterone
Cortisone
16-methylcortisone
21-methylcortisone
16-methylenecortisone
16α-hydroxy cortisone and the (16α,17α)-acetonide thereof
Hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α-21-dihydroxypregna-4,9(11)-diene-3,20-dione and the (16,17)-acetonide thereof
21-fluoro-17α-hydroxypregna-4,9(11)-diene-3,20-dione and the (16,17)-acetonide thereof
21-fluoro-17α-hydroxypregn-4-ene-3,11,20-trione and the (16,17)-acetonide thereof
21-fluoro-11,17α-dihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dienoic acid (esters)
3,11-dioxopregna-4,17-dienoic acid (esters)
11-hydroxy-3-oxopregna-4,17-dienoic acid (esters)
9(11)-dehydro-3-oxopregna-4,17-dienoic acid (esters)
21-fluoro-17α-acyloxyprogesterone
Progesterone
16-methylprogesterone
11-oxoprogesterone
9(11)-dehydroprogesterone
21-methylprogesterone
Diosgenone
17α-cyano-17β-hydroxyandrost-4-en-3-one
16-methyl-16,17-dehydroprogesterone
16-cyano-progresterone
16-carbalkoxyprogesterone
16-hydroxymethylprogesterone
3-(3-oxo-17β-hydroxyandrost-4-en-17α-yl)propionic acid
21-fluoroprogesterone
Testololactone
16-fluoro-corticoids The 9α-fluoro derivatives of the above 11β-hydroxy and 11-oxo-steroids Following is a description by way of example of methods of carrying the invention into effect.

EXAMPLE 1

*Preparation of 3-Ethoxy-6-Formyl-16α,17α-Isopropylidenedioxypregna-3,5-Dien-20-One*

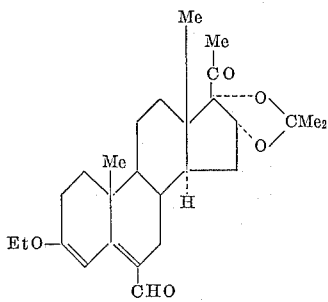

Sulphuric acid (4 drops: concentrated) in dioxan (8 ml.) was added to a suspension of 16α,17α-isopropylidene dioxypregn-4-ene-3,20-dione (Cooley, Ellis, Hartley and Petrow, J. Chem. Soc., 1955, 4373) (8.5 g.) in a mixture of dioxan (45 ml.) and ethyl orthoformate (9 ml.). Crystals began to separate after 15 minutes. After 30 minutes, pyridine (0.5 ml.) was added, followed by a large volume of water. The precipitate was crystallised from aqueous dioxan containing a trace of pyridine to give the enol ethyl ether, needles, M.P. 216 to 217° C., $[\alpha]_D^{21}$ —64° (c., 1.0 in chloroform).

A stirred mixture of dimethylformamide (11 ml.) and ethylenedichloride (40 ml.) at 0° C. was treated with phosgene (7.5 g.) in ethylenedichloride (75 ml.) added dropwise over 30 minutes. Ten minutes later, a suspension of the foregoing enol ether (10 g.) in ethylenedichloride (50 ml.) was added, and the mixture stirred at room temperature for 2 hours. After hydrolysis with aqueous methanol-sodium acetate, the product was isolated with ether and purified from ethanol. 3-ethoxy-6-formyl - 16α,17α - isopropylidenedioxypregna - 3,5 - dien-20-one separated in needles, M.P. 203 to 206° C., $[\alpha]_D^{25}$ —85° (c., 0.81)

$\gamma_{max.}^{Nujol}$ 1700, 1660, 1620, 1580 cm.$^{-1}$

EXAMPLE 2

*Preparation of 21-Acetoxy-3-Methoxy-6-Formylpregna-3,5-Dien-20-One*

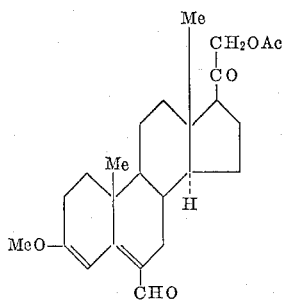

The 3-methyl enol ether of desoxycorticosterone acetate [10.5 g., M.P. 158 to 160° C., $[\alpha]_D^{26}$ —15.2 (c., 0.92 in dioxan), prepared by treating desoxycorticosterone acetate with methyl orthoformate and a trace of concentrated sulphuric acid in dioxan] in dry ethylene dichloride (50 ml.) containing a trace of pyridine was added at 0° C. to a suspension of the complex prepared from dimethylformamide (5.75 g.) and phosgene (3.9 g.) in dry ethylenedichloride (65 ml.). The mixture was stirred and allowed to warm to room temperature over 2½ hours, after which time it was poured into a solution of sodium acetate (anhydrous, 15 g.) in methanol (100 ml.). After a further 10 minutes, water was added, the product was extracted into ether, the extract was washed with aqueous sodium carbonate and water, dried over anhydrous sodium sulphate, treated with charcoal and evaporated to dryness under reduced pressure. Crystallisation from aqueous methanol gave 21-acetoxy-3-methoxy-6-formylpregna-3,5-dien-20-one as needles, M.P. 128 to 130° C., $[\alpha]_D^{27}$ —59.5° (c., 0.95 in chloroform), $\lambda_{max.}$ 218.5 to 220 mμ (ε 10,280) and 319.5 to 321.5 mμ (ε 15,420).

EXAMPLE 3

*Preparation of 17α,20:20,21-Bismethylenedioxy-3-Ethoxy-6-Formylpregna-3,5-Dien-11-One*

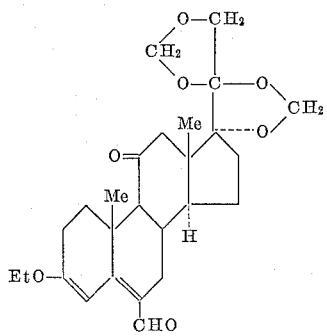

17α,20:20,21 - bismethylenedioxy - 3 - ethoxypregna-3,5-dien-11-one [9.8 g., M.P. 167 to 169° C., $[\alpha]_D^{22}$ —137° (c., 0.63 in chloroform), prepared from bismethylenedioxy cortisone and ethyl orthoformate in the presence of a trace of concentrated sulphuric acid in dioxan] suspended in dry ethylenedichloride (50 ml.) containing a few drops of pyridine was added at 0° C. to a suspension of the complex prepared from dimethylformamide (4.38 ml.) and phosgene (3 g.) in dry ethylenedichloride (50 ml.). The mixture was stirred and allowed to warm to room temperature over 3 hours. 17α,20:20,21-bismethylenedioxy - 3 - ethoxy - 6 - formylpregna - 3,5 - dien - 11-one was isolated as described in Example 2. It crystallised from dichloromethane/methanol, M.P. 212 to 215° C., $[\alpha]_D^{25}$ —154° (c., 0.88 in CHCl$_3$), $\lambda_{max.}^{EtOH}$ 218 to 219 mμ (ε 11,280) and 321 mμ (ε 15,680)

EXAMPLE 4

*Preparation of 3-Methoxy-6-Formylpregna-3,5-Dien-20-One*

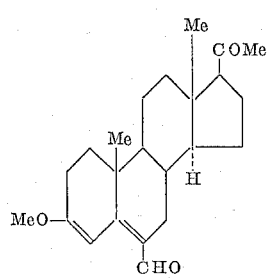

The 3-methyl enol ether of progesterone [1 g., M.P. 158 to 160° C., $[\alpha]_D^{25}$ —65° (c., 0.71 in dioxan) $\lambda_{max.}$ 240 mμ (ε 19,150) prepared from progesterone and methyl orthoformate in dioxan containing a trace of toluene-p-sulphonic acid], suspended in dry ethylenedichloride (5 ml.) containing a trace of pyridine, was added at 0° C. to a suuspension of the complex formed from dimethylformamide (1.4 ml.) in ethylenedichloride (4 ml.) and 10% w./v. phosgene/ethylenedichloride solution (7.5 ml.). The mixture was stirred and allowed to warm to room temperature over 2 hours. 3-methoxy-6-formylpregna-3,5-dien-20-one, $\gamma_{max.}$ 1707, 1668, 1618, 1584 cm.$^{-1}$ (in CH$_2$Cl$_2$), was isolated as in Example 2.

EXAMPLE 5

*Preparation of 3-Methoxy-6-Formylandrosta-3,5-Dien-17-One*

Phosgene (7.5 g.) in ethylenedichloride (75 ml.) was added dropwise, over 30 minutes, to a stirred mixture of dimethylformamide (11 ml.) and ethylenedichloride (40 ml.) maintained at 0° C. After being stirred for a further 10 minutes, the mixture was treated with a solution of 3-methoxyandrosta-3,5-dien-17-one (M.P. 158° C., prepared from androst-4-ene-3,20-dione, and methyl orthoformate in dioxan containing a trace of toluene-p-sulphonic acid) (10 g.) in ethylenedichloride (50 ml.), and the whole stirred at room temperature for 1½ hours. After hydrolysis with aqueous methanol/sodium acetate, the product was isolated with ether to give 3-methoxy-6-formylandrosta-3,5-dien-17-one, needles (from aqueous methanol), M.P. 191 to 193° C., $[\alpha]_D^{20}$ —92° (c., 0.61 in chloroform), $\gamma_{max.}$ 1750, 1650, 1610 and 1580 cm.$^{-1}$.

EXAMPLE 6

*Preparation of 17β-Acetoxy-3-Ethoxy-6-Formyl-2α-Methylandrosta-3,5-Diene*

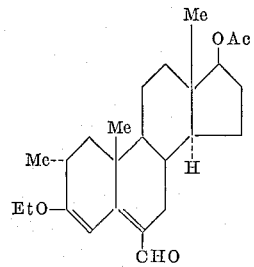

The 3-ethyl enol ether of 2α-methyltestosterone acetate (6 g.) [M.P. 188 to 190° C., $[\alpha]_D^{25}$ —121.9° (c., 0.64 in pyridine) prepared from 2α-methyltestosterone acetate and ethyl orthoformate in dioxan, containing a trace of sulphuric acid] in dry ethylenedichloride (30 ml.) was added at 0° C. to a suspension of the complex formed from phosgene [3.4 g. in 34 ml. dry ethylenedichloride] and dimethylformamide (6.6 ml.) in ethylenedichloride (32 ml.). The mixture was stirred and allowed to come to room temperature over 3 hours, 17β-acetoxy-3-ethoxy-6-formyl-2α-methylandrosta-3,5-diene, isolated as in Example 2, separated from aqueous methanol, M.P. 188 to 119° C., $[\alpha]_D^{25}$ —123° (c., 1.28 in CHCl₃), $\lambda_{max.}^{EtOH}$ 220.5 mμ (ε 10,250) and 322 to 324 mμ (ε 15,250)

EXAMPLE 7

*Preparation of 3-Ethoxy-6-Formyl-25D-Spirosta-3,5-Diene*

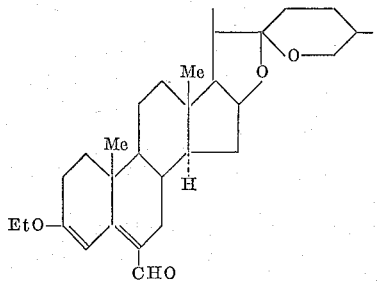

Concentrated sulphuric acid (4 drops) in Analar dioxan (8 ml.) was added to a suspension of diosgenone (8.5 g.) in Analar dioxan (45 ml.) and ethylorthoformate (9 ml.). After one hour, pyridine (0.5 ml.) was added, and the solution poured into a large excess of water. The precipitate was crystallised from acetone, containing a trace of pyridine, to give the enol ethyl ether, long needles, M.P. 171 to 174° C.

A stirred mixture of dimethylformamide (1.1 ml.) and ethylenedichloride (4 ml.) at 0° C. was treated with phosgene (0.75 g.) in ethylenedichloride (7.5 ml.) added dropwise over ½ hour. Stirring was continued for 10 minutes, after which time a suspension of the foregoing enol ether (1 g.) in ethylenedichloride (5 ml.) was added. The mixture was stirred at room temperature for ¾ hour. After hydrolysis with aqueous methanol/sodium acetate, the product was isolated with ether to give 3-ethoxy-6-formyl-25D-spirosta-3,5-diene, $\gamma_{max.}$ 1660, 1620, 1580 cm.$^{-1}$.

EXAMPLE 8

*Preparation of 17α-Acetoxy-6-Formyl-3-Methoxy-16-Methylenepregna-3,5-Diene-20-One*

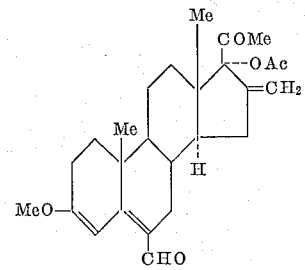

17α-acetoxy-16-methylenepregn-4-ene-3,20-dione (Kirk, Petrow, Stansfield and Williamson, J. Chem. Soc., 1960, 2385) (3.3 g.) suspended in dioxan (18 ml.) containing methylorthoformate (3.6 ml.) was mixed with dioxan (3.2 ml.) containing 2 drops of concentrated sulphuric acid. On stirring, the steroid dissolved and after 5 minutes the product crystallised. Pyridine was added to the mixture which was poured into water and the precipitated solids were collected and crystallised from methanol containing pyridine to give 17α-acetoxy-3-methoxy-16-methylenepregna-3,5-dien-20-one as needles, M.P. 225 to 227° C., $[\alpha]_D^{23}$ —242° (c., 1.01 in chloroform), $\lambda_{max.}^{EtOH}$ 240.5 mμ (ε = 19,300)

To a solution of dimethylformamide (1.25 ml.) in ethylenedichloride (5 ml.), cooled in an ice-bath was added dropwise 10 ml. of a 9.5% w./v. solution of phosgene in ethylenedichloride. The resulting white slurry was stirred for a further 10 minutes and then a suspension of 17α-acetoxy-3-methoxy-16-methylenepregna-3,5-dien-20-one (3.4 g.) in ethylenedichloride (20 ml.) was added. The mixture was stirred and the temperature was allowed to rise. After 20 minutes, the reaction mixture was poured into a solution of sodium acetate (3 g.) in methanol (20 ml.) and water (5 ml.) and shaken well. The product was isolated with ether and purified from aqueous methanol to give 17α-acetoxy-6-formyl-3-methoxy-16-methylenepregna-3,5-dien-20-one, M.P. 203 to 205° C., $\lambda_{max.}^{EtOH}$ 220 mμ and 321 mμ

EXAMPLE 9

*Preparation of 6-Formyl-3-Methoxy-16-Methylpregna-3,5,16-Trien-20-One*

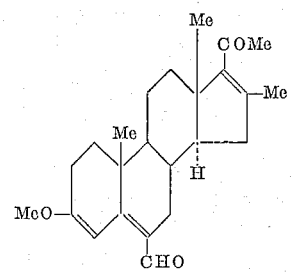

5 g. of 16-methyl-16-dehydroprogesterone were dissolved in a mixture of methyl orthoformate (5 ml.) and dioxan (40 ml.) and a drop of concentrated sulphuric acid added. After 20 minutes at room temperature, during which the mixture was occasionally swirled, pyridine (3 ml.) was added and the whole diluted with water, filtered, and the dry solid recrystallised from acetone with a drop of pyridine to give the corresponding enol methyl ether (3.5 g.), M.P. 160 to 164° C.

Dimethylformamide (6.1 ml.) in ethylenedichloride (21 ml.) was cooled and stirred at 0° C. and 40 ml. of a 10% w./v. solution of phosgene in ethylenedichloride added dropwise over 30 minutes. After 10 minutes further stirring, 5.53 g. of the foregoing enol ether in suspension in 50 ml. ethylenedichloride was added all at once. The mixture was stirred at room temperature for 4 hours, and left for 24 hours. The dark red solution was then poured into a solution of 8 g. potassium acetate, 15 ml. water and 60 ml. methanol, shaken, water added, and the whole ether-extracted. The combined extracts were washed with water, sodium bicarbonate, water, dried and evaporated.

The residual oil was percolated through a short column of alumina in benzene, and the yellow fractions combined and evaporated to give an oil which solidified on trituration with hexane. The solid was recrystallised from benzene/hexane to give the pure 6-formyl derivative, M.P. 76° to 80° C., $\gamma_{max.}$ 1588, 1618, 1649 cm.$^{-1}$, $\lambda_{max.}^{EtOH}$ 322 m$\mu$ ($\epsilon$ 14,115) and 244 m$\mu$ ($\epsilon$ 11,315)

EXAMPLE 10

*Preparation of 17β-Acetoxy-6-Formyl-3-Methoxy-androsta-3,5-Diene*

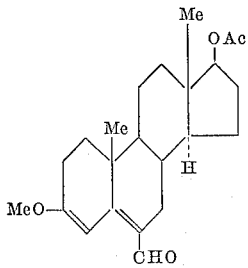

A solution of dimethylformamide (16 g.; 0.22 mol.) in ethylenedichloride (130 ml.; anhydrous) was cooled to 0° C. and stirred during dropwise addition of phosgene [11 g. (0.11 mol.) in 10% w./v. solution in ethylenedichloride] over ½ hour. A white precipitate formed. After an additional 10 minutes stirring, 17β-acetoxy-3-methoxyandrosta-3,5-diene (34.4 g., 0.1 mol.) in ethylenedichloride (160 ml.) containing pyridine (0.1 ml.) was added all at once. The mixture was stirred and the temperature allowed to rise to room temperature. A deep red colour developed rapidly. The solution was stirred for 1 hour, during which the complex dissolved. The mixture was then poured into a solution of sodium acetate (25 g.; anhydrous) in water (25 ml.) and methanol (150 ml.), stirred 10 minutes, diluted with water, and the product was extracted with ether. The ether was washed with water and sodium bicarbonate solution, dried (sodium sulphate), stirred with charcoal, filtered and the solvents removed in vacuo. The residue was treated with a little acetone which was removed in vacuo to eliminate ethylenedichloride. The residue was purified from acetone/hexane, followed by methanol to give 17β - acetoxy-6-formyl-3-methoxyandrosta-3,5-diene as blades, M.P. 159 to 162° C., $\lambda_{max.}^{EtOH}$ 320 m$\mu$ ($\epsilon$ 14,930) and 220 m$\mu$ ($\epsilon$ 10,240); $\gamma_{max.}$ (in CH$_2$Cl$_2$) 1726, 1651, 1616, and 1581 cm.$^{-1}$, $[\alpha]_D^{25}$ −153° (c., 0.86 in dioxan)

EXAMPLE 11

*Preparation of 17β-Acetoxy-6-Formyl-3-Methoxy-androsta-3,5-Diene*

A solution of freshly distilled phosphorus oxychloride (20 g.) in anhydrous ethylenedichloride (80 ml.) was added dropwise to a stirred solution of dimethylformamide (20 ml.) in ethylenedichloride (80 ml.) which was cooled in ice. 17β-acetoxy-3-methoxyandrosta-3,5-diene (20 g.) was added to the solution which was stirred and allowed to warm to room temperature over 2 hours. The mixture was poured into water (60 ml.) and methanol (120 ml.) containing sodium acetate (60 g.), stirred for 20 minutes, then diluted with water (600 ml.) and the product extracted with ether, which was washed with water, sodium hydrogen carbonate solution, and water, dried (sodium sulphate), stirred with decolourising charcoal, filtered, and the solvents removed under reduced pressure. The residue was purified from acetone/hexane to give the 6-formyl derivative, M.P. 159 to 162° C.

EXAMPLE 12

*Preparation of 17α-Acetoxy-6-Formyl-3-Methoxy-pregna-3,5-Dien-20-One*

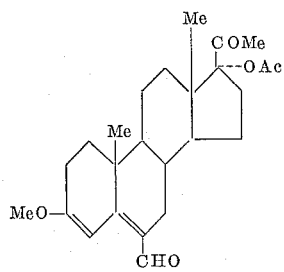

17α - acetoxy-3-methoxypregna-3,5-dien-20-one (M.P. 175 to 180° C., $[\alpha]_D^{20}$ −147° (c., 1.0 in dioxan) prepared from 17α-acetoxyprogesterone and trimethylorthoformate in dioxan, with sulphuric acid as catalyst, and purified from acetone/hexane or chloroform/ethanol +1% pyridine) (18.5 g.), in ethylenedichloride (150 ml.) was added to the complex prepared at 0° C. from dimethylformamide (18 ml.) in ethylene dichloride (65 ml.) and phosgene (12.5 g.) in ethylenedichloride (120 ml.), and the mixture was stirred and allowed to warm to room temperature over 3 hours. The resulting complex was hydrolysed in aqueous methanol (150 ml., 90%) containing sodium acetate (25 g.) for 10 minutes. The product was extracted with ether which was washed with sodium carbonate solution and water, dried (sodium sulphate), decolourised (charcoal) and the solvent removed. The 6-formyl derivative, purified from acetone/hexane, followed by ethanol, formed prisms, M.P. 218 to 223° C., $[\alpha]_D^{25}$ −158° (c., 1.06 in CHCl$_3$);

$\lambda_{max.}^{EtOH}$ 219 to 220 m$\mu$ ($\epsilon$ 10,570) and 321 m$\mu$ ($\epsilon$ 15,380);

$\gamma_{max.}$ (in CH$_2$Cl$_2$) 1729, 1714, 1651, 1612 and 1581 cm.$^{-1}$

EXAMPLE 13

*Preparation of 21-Acetoxy-3-Ethoxy-6-Formyl-17α-Hydroxypregna-3,5-Diene-11,20-Dione*

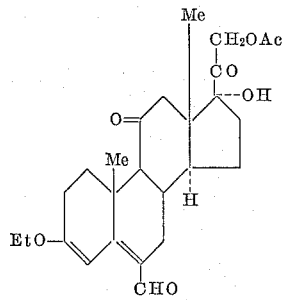

Cortisone acetate 3-enol ethyl ether (5 g.) in ethylenedichloride (160 ml.) containing a drop of pyridine was added to the complex prepared at 0° C. from dimethylformamide (5.5 ml.) in ethylenedichloride (20 ml.) and phosgene (3.6 g.) in ethylenedichloride (35 ml.) After stirring for 2 hours, while the mixture was allowed to warm to room temperature, an orange-red precipitate had formed. The mixture was poured into methanol (100 ml.) containing sodium acetate (10 g.) and stirred for ½ hour, then ether and water were added, and the ether was washed with water, sodium hydrogen carbonate solution, and water, the washings being re-extracted with ether.

The combined ethereal solutions were dried (sodium sulphate), stirred with charcoal, filtered, and the solvents removed under reduced pressure. The residue was purified from aqueous methanol to give the 6-formyl derivative in pale yellow flakes, M.P. 194 to 197° C., $[\alpha]_D^{26}$ −15° (c., 0.98 in CHCl$_3$);

$\lambda_{max.}^{EtOH}$ 217 to 218 m$\mu$ ($\epsilon$ 11,320) and 320 m$\mu$ ($\epsilon$ 14,860); $\gamma_{max.}$ (in Nujol) 3528, 3358, 1723, 1702, 1645, 1607, and 1572 cm.$^{-1}$

EXAMPLE 14

*Preparation of 3-Methoxy-17α-Hydroxy-6-Formyl-16-Methylenepregna-3,5-Diene-20-One*

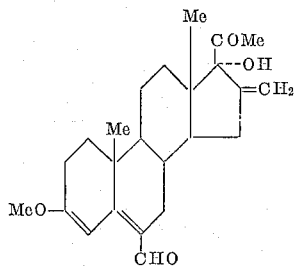

16α,17α-epoxy-16β-methylprogesterone (5 g.), dioxan (50 ml.) and methylorthoformate (5 ml.) were treated with p-toluenesulphonic acid (150 mg.) and allowed to stand for 1 hour at room temperature. Pyridine (0.5 ml.) was then added and the solution poured into ice-water. Filtration and crystallisation of the resulting solid from methylene chloride/methanol gave 3-methoxy-16α,17α-epoxy-16β-methylpregna-3,5-diene-20-one, M.P. 128 to 130° C., $[\alpha]_D$ −71° (CHCl$_3$).

To a suspension of the phosgene/dimethylformamide complex prepared from dimethylformamide (3.2 g.; 0.044 M) and phosgene (2.18 g.; 0.022 M) in ethylenedichloride (15 ml.) was added a solution of the foregoing enol ether (3.56 g.; 0.01 M) in ethylenedichloride (20 ml.) at 0° C. and the reaction mixture was then allowed to warm to room temperature. After 1 hour a solution of anhydrous sodium acetate (6 g.) in water (10 ml.) and methanol (40 ml.) was added and the mixture stirred for a further 15 minutes. More water was added and the product isolated with ether. Crystallisation from acetone/hexane gave 3-methoxy-17α-hydroxy-6-formyl-16-methylenepregna - 3,5-diene-20-one, M.P. 199 to 201° C., $[\alpha]_D$ −276° C.

EXAMPLE 15

*Preparation of 17β-Acetoxy-6-Formyl-3-Methoxyandrosta-3,5-Diene*

The use of phosphorus pentachloride in the preparation of 6-formyl derivatives is illustrated by the following:

To a solution of dimethylformamide (3.18 g.; 3.3 ml.) in ethylenedichloride (12 ml.) was added slowly, with stirring, at 0° C. a suspension of phosphorus pentachloride (4.0 g.) in ethylenedichloride (40 ml.). When the addition was complete (ca. 10 minutes), the reaction mixture was stirred for a further ten minutes and then a slurry of the 3-methyl enol ether of testosterone acetate (2.6 g.) was added in ethylenedichloride (8 ml.). A red colour slowly developed. The reaction mixture was stirred for three hours and then hydrolysed by a solution of sodium acetate (4.5 g.) in water (8 ml.) and methanol (35 ml.). The mixture was stirred for ten minutes and then more water was added. The organic material was extracted with ether, the ether washed with water, dilute sodium bicarbonate solution and then water, and dried over calcium chloride. The solvents were removed and the residue triturated with methanol to give the 6-formyl derivative, M.P. 160 to 163° C., after crystallisation from acetone/hexane. The M.P. was not depressed on admixture with a sample prepared by the process of Example 10.

EXAMPLE 16

The 3-enol methyl ether of testosterone acetate was converted into the 6-formyl derivative by (a) Treating a suspension of the steroid in ethylenedichloride and dimethylformamide at 0° C. with a solution of phosgene in ethylenedichloride.
(b) Treating a suspension of the steroid in dimethylformamide with phosphorus oxychloride at 0° C.
(c) Using 1.1 mol. proportions of phosgene and dimethylformamide and 1.0 mol. proportions of steroid.
(d) Treating a suspension of the steroid in dimethylformamide and ethylenedichloride with phosphorus oxychloride at 0° C.

In all cases the mixtures were left at room temperature for 2 to 3 hours and worked up as in Example 10.

EXAMPLE 17

6-formylation of 17β-acetoxy-3-methoxyandrosta-3,5-diene was carried out according to the process of Example 10, using the following formamides in place of dimethylformamide:

N,N-diethylformamide
N-ethyl-N-phenylformamide
N-formyl-piperidine
N-formyl-morpholine In all cases the 6-formyl derivative, M.P. 159 to 161° C., was obtained.

EXAMPLE 18

*Preparation of 17β-Acetoxy-3-Benzyloxy-6-Formyl-Androsta-3,5-Diene*

Phosgene (2.1 g.) in ethylenedichloride (20 ml.) was added dropwise with stirring to dimethylformamide (2.9 ml.) in ethylenedichloride (10 ml.) at 0° C. A suspension of 17β-acetoxy-3-benzyloxyandrosta-3,5-diene (8 g.) in ethylenedichloride (50 ml.) and pyridine (0.1 ml.) was added, and the mixture was stirred and allowed to warm to room temperature over 1 hour. Sodium acetate (5 g.) in methanol (50 ml.) was added, the mixture was stirred for a further 10 minutes, then water and ether were added. The organic solvents were washed with water and sodium bicarbonate solution, dried (sodium sulphate), stirred with charcoal, and the solvents removed. Purification of the solid residue from methylene chloride/methanol gave the 6-formyl derivative as needles, M.P. 199 to 201° C., $[\alpha]_D^{25}$ −143° (c., 1.18 in CHCl$_3$), $\lambda_{max.}^{EtOH}$ 322 m$\mu$ ($\epsilon$ 16,285)

EXAMPLE 19

*Preparation of 17α-Acetoxy-16-Ethylidene-6-Formyl-3-Methoxypregna-3,5-Dien-20-One*

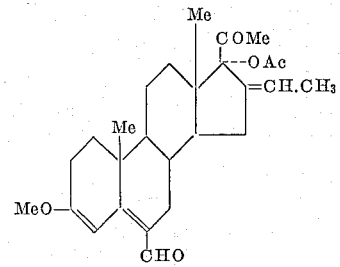

17α - acetoxy - 16 - ethylidene - 3 - methoxypregna-3,5-dien-20-one [0.58 g., M.P. 205 to 208° C., $[\alpha]_D^{25}$ −231° (c., 0.7 in CHCl$_3$), prepared from the corresponding 4-en-3-one by treatment with methyl orthoformate in dioxan containing a trace of sulphuric acid] in dry ethylenedichloride (2 ml.) containing a trace of pyridine was added at 0° C. to a stirred suspension of the complex prepared from dimethylformamide (0.8 ml.) and phosgene (0.3 g.) in dry ethylenedichloride (6 ml.). After warming to room temperature over 2 hours the mixture was worked-up as in Example 8. 17α-acetoxy- 16 - ethylidene - 6 - formyl - 3 - methoxypregna - 3,5-dien-20-one formed prisms from dichloromethane/methanol, M.P. 203 to 204° C., $[\alpha]_D^{25}$ —255° (c., 0.7 in $CHCl_3$), $\lambda_{max.}^{EtOH}$ 213 m$\mu$ (flat) ($\epsilon$ 11,750) and 320 m$\mu$ ($\epsilon$ 15,290)

EXAMPLE 20

*Preparation of 3-Ethyl-Enol Ether of 6-Formylpregna-4,17(20)-Dien-3-One-21-Oate Ethyl Ester*

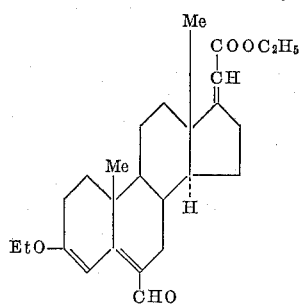

A solution of phosgene (1.45 g.) in ethylenedichloride (12 ml.) was added dropwise, during 5 minutes, to a stirred solution of dimethylformamide (2.2 ml.) in ethylenedichloride (8 ml.) at 0° C. wtih exclusion of moisture. After a further 10 minutes, stirring, a solution of 1.92 g. of 3-ethyl-enol ether of pregna-4,17(20)-dien-3-one-21-oate ethyl ester (prepared by the method of Patel, Petrow, Royer and Stuart-Webb, J. Chem. Soc., 1952, 161) in 15 ml. of ethylenedichloride, containing a few drops of pyridine, was added, and the mixture was stirred at room temperature for 2½ hours. A solution of 3 g. of sodium acetate in 5 ml. of water and 20 ml. of methanol was added, and after 10 minutes stirring, the mixture was diluted with water and extracted with ether, dried over sodium sulphate, treated with charcoal, and stripped. The resulting solid was recrystallised from ethanol as pale yellow crystals $\lambda_{max}$. 222 to 223 m$\mu$ ($\epsilon$ 26,565) and 323 m$\mu$ ($\epsilon$ 14,750) (in ethanol) $\gamma_{max.}$ (in $CCl_4$) 1715, 1662 and 1619 cm.$^{-1}$.

EXAMPLE 21

*Preparation of 6-Formyl Derivative of Testosterone Acetate 3-Methyl Enol Ether*

To a solution of 3.3 ml. (3.15 g.) dimethylformamide in 12 ml. of dry methylenedichloride was added, slowly with stirring at 0° C. a 12% w./v. solution of phosgene in ethylenedichloride (18.5 ml.). When the addition was complete, the mixture was stirred for ten minutes, a complex separating out. At the end of this time a slurry of 3.0 g. testosterone acetate 3-methyl enol ether in 8 ml. of methylenedichloride was added when the reaction mixture turned a reddish brown. It was warmed to 50° C. (bath temperature) and thus maintained for one hour. Working up as described in Example 10 yielded the 6-formyl derivative identical with a sample prepared in Example 10.

EXAMPLE 22

*Preparation of 21-Acetoxy-6-Formyl-17α-Hydroxy-3-(2'-Hydroxyethoxy)-Pregna-3,5-Diene-11,20-Dione*

The formylating reagent was prepared from dimethylformamide (5.5 ml.) in ethylenedichloride (20 ml.) and phosgene (3.6 g.) in ethylenedichloride (35 ml.) at 0 to 5° C. Cortisone acetate 3-ethylene ketal (5 g.) suspended in ethylenedichloride (50 ml.) was added, and the mixture stirred and allowed to warm to 30° C. over 4 hours. Sodium acetate (6 g.) in methanol (60 ml.) was then added, and the mixture stirred for 60 minutes. Ether and water were added, and the organic layer was washed with water and sodium bicarbonate solution, dried (sodium sulphate), stirred with charcoal, filtered, and the solvent removed under reduced pressure to give 21 - acetoxy - 6 - formyl - 17α - hydroxy - 3 - (2' - hydroxyethoxy) - pregna - 3,5 - diene - 11,20 - dione, M.P. 146 to 150° C., $\lambda_{max.}$ 219 m$\mu$ ($\epsilon$ 10,300) and 321 m$\mu$ ($\epsilon$ 13,900), $[\alpha]_D^{25}$ —2° (c., 0.41 in dioxan).

EXAMPLE 23

*Preparation of 3-Ethoxy-6-Formyl-17β-Propionoxy-17α-(Prop-1'-Ynyl)Androsta-3,5-Diene*

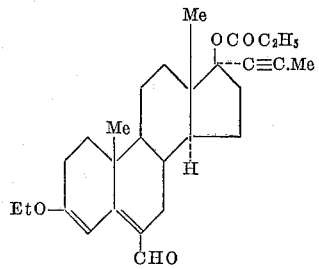

A solution of 17β-hydroxy-17α-(prop-1'-ynyl)-androst-4-en-3-one (Barton, Burn, Cooley, Ellis and Petrow, J. Chem. Soc., 1959, 1957) (5 g.) in propionic anhydride (25 ml.) and pyridine (25 ml.) was boiled under reflux for 4 hours, cooled and poured into water. The precipitated solid was recrystallised from aqueous methanol to give 17β-propionoxy-17α-prop-1'-ynyl)androst-4-en-3-one as laths, M.P. 128 to 129° C. $[\alpha]_D^{26}$ +9° (c., 1.0 in chloroform).

A solution of the foregoing compound (3.75 g.) in dry dioxan (20 ml.) and ethyl orthoformate (2 ml.) was treated with a solution of concentrated sulphuric acid (2 drops) in dry dioxan (5 ml.) and left at room temperature for 30 minutes. Pyridine (5 ml.) was added and the mixture poured into water (200 ml.) to give a gum, which was isolated with ether and crystallised from aqueous methanol (containing a trace of pyridine) to give 3 - ethoxy - 17β - propionoxy - 17α - (prop - 1'-ynyl)androsta-3,5-diene, small needles, M.P. 106 to 107° C., $[\alpha]_D^{26}$ —192° (c., 1.03 in chloroform).

The foregoing compound (2 g.) was added to a stirred, ice-cooled suspension of the formylating reagent [prepared by the addition of a solution of phosgene in ethylenedichloride (7 ml., 12%) to a solution of dimethylformamide (1.1 ml.) in ethylenedichloride (10 ml.)] containing a trace of pyridine. The mixture was stirred at room temperature for 1 hour, when a solution of sodium acetate (3 g.) in water (5 ml.) and methanol (20 ml.) was added, and the mixture stirred for a further 10 minutes. Water (100 ml.) was added and the product isolated with ether to give 3-ethoxy-6-formyl-17β - propionoxy - 17α - (prop - 1' - ynyl)androsta - 3,5-diene, $\gamma_{max.}^{Nujol}$ 1730, 1650, 1620 and 1580 cm.$^{-1}$

EXAMPLE 24

*Preparation of 21 - Acetoxy-17α-Hydroxy-3-Methoxy-6-Formylpregna-3,5,9(11)-Trien-20-One*

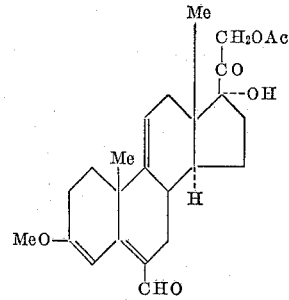

(a) 21 - acetoxy-17α-hydroxy-3-methoxypregna - 3,5, 9(11)-trien-20-one was prepared from 21-acetoxy-17α-hydroxypregna-4,9(11)-diene-3,20 - dione (10 g.), trimethyl orthoformate (12 ml.) and toluene-p-sulphonic acid (0.6 g.) in tetrahydrofuran (120 ml.) by heating at 45° C. for 1 hour and adding pyridine (2 ml.). The product was precipitated into water (2 litres), and purified from aqueous methanol to give needles, M.P. 158 to 166° C., $[\alpha]_D^{25}$ —84° (c., 0.89 in dioxan), $\lambda_{max.}$ 240 to 241 m$\mu$ ($\epsilon$ 19,700).

(b) 21 - acetoxy-17α-hydroxy-3-methoxypregna - 3,5, 9(11)-trien-20-one prepared as described above (8 g.) was dissolved in ethylenedichloride (80 ml.) containing a drop of pyridine and the solution added to the reagent prepared at 0° C. from dimethylformamide (6 ml.) in ethylenedichloride (30 ml.) and phosgene (3.5 g.) in ethylenedichloride (35 ml.). After stirring for 1 hour sodium acetate (6 g.) in methanol (80 ml.) was added, and stirring continued for 10 minutes. The product [isolated as in Example 13] was purified from aqueous methanol to give the 6-formyl derivative, soft needles, M.P. 180 to 184° C., $[\alpha]_D^{25}$ —95° (c., 1.42 in chloroform), $\lambda_{max.}$ 219 to 220 m$\mu$ ($\epsilon$ 12,100) and 322 m$\mu$ ($\epsilon$ 15,400).

EXAMPLE 25

*Preparation of 3-Methoxy-6-Formyl-17α,21 - Methoxymethylenedioxypregna-3,5-Diene-11,20-Dione*

3-methoxy - 17α,21 - methoxymethylenedioxypregna-3,5-diene-11,20-dione was prepared from cortisone (10 g.), trimethyl orthoformate (20 ml.), toluene-p-sulphonic acid (0.5 g.) and benzene (400 ml.), by slow distillation of the solution for ½ hour, addition of pyridine (5 ml.), washing with water, evaporaton of the solvent, and purification from ethanol. It was obtained as prisms, M.P. 147 to 152° C., $[\alpha]_D^{24}$ —31° (c., 0.51 in CHCl$_3$). The last compound (1 g.) in ethylenedichloride (20 ml.) was added to the complex prepared at 0° C. from phosgene (0.3 g.) in ethylenedichloride (3 ml.) and dimethylformamide (0.8 ml.) in ethylenedichloride (5 ml.). After stirring for 1 hour at room temperature sodium acetate (1 g.) in methanol (20 ml.) was added and stirring continued for 10 minutes. Ether and water were added, and the organic layer was washed, dried (sodium sulphate) and the solvents removed. Purification from aqueous methanol gave the 6-formyl derivative as needles, M.P. 185 to 190° C., $\lambda_{max.}$ 219 m$\mu$ ($\epsilon$ 11,560) and 322 m$\mu$ ($\epsilon$ 14,050), of the following structure

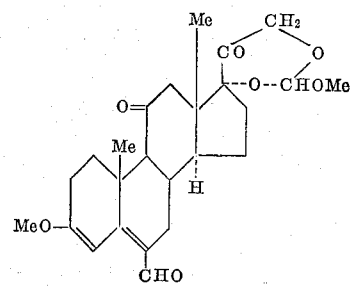

EXAMPLE 26

*Preparation of 17β-Hydroxy-3-Methoxy-6-Formyl-Androsta-3,5-Diene*

17β - hydroxy-3-methoxyandrosta-3,5-diene was prepared by hydrolysis of the corresponding 17β-acetoxy derivative with potassium hydroxide in methanol followed by purification from aqueous methanol. It formed flakes, M.P. 125 to 127° C., $[\alpha]_D^{21}$ —128° (c., 0.93 in dioxan), $\lambda_{max.}^{EtOH}$ 240 m$\mu$ ($\epsilon$ 17,540)

It was treated with 2.5 equivalents of the formylating reagent to give the 17-formoxy-6-formyl derivative, which, on prolonged boiling with methanol afforded 17β-hydroxy-3-methoxy-6-formylandrosta-3,5-diene, polyhedral crystals, M.P. 105 to 110° C., $[\alpha]_D^{25}$ —144° (c., 1.28 in chloroform), $\lambda_{max.}$ 220 m$\mu$ ($\epsilon$ 10,050) and 322 m$\mu$ ($\epsilon$ 15,100).

EXAMPLE 27

*Preparation of 17β-Acetoxy-17α-Methyl-3-Methoxy-6-Formylandrosta-3,5-Diene*

(a) Sulphuric acid (0.12 ml.) was added to a solution of 17α-methyltestosterone acetate (Miescher and Klarer, Helv. Chim. Acta, 1939, 22, 962) (10 g.) in a mixture of dry dioxan (100 ml.), methyl orthoformate (10 ml.) and methanol (1 ml.). After 25 minutes at room temperature, pyridine (0.6 ml.) was added followed by a large volume (ca. 1 l.) of water. The aqueous supernatant was decanted off and the residual gum crystallised from methanol containing a trace of pyridine to give 3-enol methyl ether, flat needles, M.P. 112 to 114° C., $[\alpha]_D^{25}$ —141° (c., 0.87 in chloroform)

$\lambda_{max.}^{EtOH}$ 240 m$\mu$ ($\epsilon$ 18,785)

(b) A stirred mixture of dimethylformamide (8.5 ml.) and ethylenedichloride (30 ml.) at 0° C. was treated with phosgene (5.5 g.) in ethylenedichloride (55 ml.) added dropwise over 15 minutes. Ten minutes later, a solution of the foregoing enol ether (7.5 g.) in ethylenedichloride (37.5 ml.) was added, and the mixture stirred at room temperature for 2 hours. After hydrolysis with aqueous methanol/sodium acetate, the product was isolated with ether and purified from methanol. 17β-acetoxy - 6 - formyl-3-methoxy - 17α-methylandrosta-3,5-diene formed prisms, M.P. 118 to 123° C., $[\alpha]_D^{25}$ —141° (c., 0.84 in dioxan)

$\lambda_{max.}^{EtOH}$ 220 m$\mu$ ($\epsilon$ 10,550) and 322 m$\mu$ ($\epsilon$ 15,690), $\gamma_{max.}^{Nujol}$ 1740, 1660, 1620, 1580 cm.$^{-1}$

EXAMPLE 28

*Preparation of 6-Formyl-3-Methoxy-21-Methylpregna-3,5-Dien-20-One*

21-methylprogesterone (Helv. Chim. Acta, 1940, 23, 1371) (10 gms.) was dissolved in dioxan (50 ml.) and mixed with methylorthoformate (11 ml.), methyl alcohol (0.5 ml.) and toluene-p-sulphonic acid (1.0 g.) and left for 30 minutes at room temperature. Pyridine (3 ml.) was added to the mixture and the product was precipitated by the addition of water. The solids were collected and crystallised from methanol containing a few drops of pyridine to give 3-methoxy-21-methylpregna-3,5-dien-20-one as needles.

Phosgene dissolved in ethylenedichloride (40 mls. of a 10% w./v. solution) was added dropwise to a stirred solution of dimethylformamide (6.1 ml.) in ethylenedichloride (20 mls.) cooled in an ice bath. 3-methoxy-21-methylpregna-3,5-dien-20-one (10 g.) in ethylenedichloride (30 ml.) was added and the reaction mixture was stirred and the cooling bath was removed. After two hours, the mixture was poured into aqueous methanolic sodium acetate solution and the product isolated with ether. 6-formyl-3-methoxy-21-methylpregna-3,5-dien-20-one was obtained as an amorphous solid;

$\lambda_{max.}^{EtOH}$ 219 to 221 m$\mu$ and 318 to 321 m$\mu$

EXAMPLE 29

*Preparation of 3-ethoxy-6-Formyl-17β-Propionoxy-17α-Vinylandrosta-3,5-Diene*

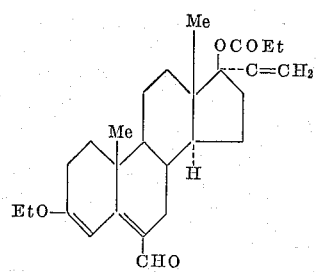

(a) A solution of 17α-vinyltestosterone (5 g.) in propionic anhydride (25 ml.) and pyridine (25 ml.) was boiled under reflux for 4 hours, cooled and poured into water. The precipitated solids were recrystallised from aqueous methanol to give 17β-propionoxy-17α-vinylandrost-4-en-3-one as needles, M.P. 126 to 127° C., $[\alpha]_D^{24}$ +104° (c., 1.06 in chloroform).

A solution of the foregoing compound (4.15 g.) in dry dioxan (25 ml.) and ethyl orthoformate (2.5 ml.) was treated with a solution of concentrated sulphuric acid (3 drops) in dry dioxan (3 ml.) and the mixture left at room temperature for 30 minutes. Pyridine (2 ml.) was added and the mixture diluted with water. The precipitated oil was isolated with ether and crystallised from methanol (containing a trace of pyridine) to give 3-ethoxy-17β-propionoxy - 17α - vinylandrosta-3,5-diene, small needles, M.P. 103 to 104° C., $[\alpha]_D^{26}$ —96° (c. 0.95 in chloroform).

The foregoing compound (2 g.) was added to a stirred ice-cooled suspension of the formylating reagent [prepared by the addition of a solution of phosgene in ethylenedichloride (10%, 7 ml.) to a solution of dimethylformamide (1.5 ml.) in ethylenedichloride (8 ml.)] containing a trace of pyridine. The mixture was stirred at room temperature for 1 hour, then stirred for 10 minutes with a solution of sodium acetate (3 g.) in water (5 ml.) and methanol (20 ml.). Water (100 ml.) was added, and the product isolated with ether, to give 3-ethoxy-6-formyl-17β-propionoxy - 17α - vinylandrosta-3,5-diene as a gum, $\gamma_{max.}^{Nujol}$ 1730, 1650, 1620 and 1580 cm.$^{-1}$

EXAMPLE 30

*Preparation of the 6-Formyl Derivative of Testosterone Acetate 3-Enol Methyl Ether*

Phosgene (2 g.) in ethylenedichloride (17 ml.) was added to a suspension of testostreone acetate 3-enol methyl ether (3.44 g.) in 20 ml. ethylenedichloride and dimethylformamide (5 ml.) and the mixture stirred for 2½ hours at room temperature. On isolating the product by the method of Example 10, the 6-formyl derivative was obtained.

EXAMPLE 31

*Preparation of 20β-Acetoxy-3-Ethoxy-6-Formylpregna-3,5-Diene*

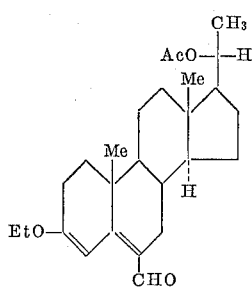

(a) A solution of 20β-acetoxy-3-ethoxypregna-3,5-diene [6 g. M.P. 126 to 129° C., $[\alpha]_D^{25}$ —80.6° (c., 1.08 in dioxan), $\lambda_{max.}^{EtOH}$ 241 mμ (ε 19,990)

prepared from 20β-acetoxypregn-4-en-3-one by treatment with ethyl orthoformate in dry dioxan containing a trace of sulphuric acid] in dry ethylenedichloride (35 ml.) was added at 0° C. to a stirred suspension of the complex prepared from phosgene (1.7 g.) and dimethylformamide (2.5 g.) in ethylenedichloride (50 ml.) and the mixture was allowed to warm to room temperature over 1½ hours. The product was isolated as described in Example 10 and crystallised from aqueous methanol to give 20β-acetoxy-3-ethoxy-6-formylpregna-3,5-diene as needles, M.P. 185 to 189° C., $[\alpha]_D^{25}$ —61° (c., 0.97 in chloroform)

$\lambda_{max.}^{EtOH}$ 222 to 223 mμ (ε 10,820) and 322 mμ (ε 13,520)

EXAMPLE 32

*Preparation of 17α-Acetoxy-6-Formyl-3-Methoxy-16α-Methylpregna-3,5-dien-20-One*

17α-acetoxy-16α-methylpregn-4-ene-3,20-dione (British patent application No. 29,378/60) (3 g.) was dissolved in dioxan (18 ml.) and treated with methyl orthoformate (3.2 ml.), methanol (0.1 ml.) and toluene-p-sulphonic acid (0.3 g.) for 30 minutes at room temperature. The product was precipitated by the addition of pyridine and water and crystallised from methanol containing a few drops of pyridine to give 17α-acetoxy-3-methoxy-16α-methylpregna-3,5-dien-20-one, plates, M.P. 198 to 200° C., $\lambda_{max.}^{EtOH}$ 240 mμ (ε 19,545)

Phosgene in ethylenedichloride (9.5 ml. of a 10% w./v. solution) was added dropwise with stirring to dimethylformamide (1.25 ml.) in ethylenedichloride (5 ml.) cooled in an ice bath. 17α-acetoxy-3-methoxy16α-methylpregna-3,5-dien-20-one (3.3 g.) in ethylenedichloride (20 ml.) was added and the mixture was stirred and the temperature allowed to rise spontaneously. After 1 hour, the reaction mixture was poured into aqueous methanolic sodium acetate solution and the product isolated with ether. 17α-acetoxy-6-formyl-3-methoxy-16α-methylpregna-3,5-dien-20-one crystallised from methanol, as rods, M.P. 211 to 214° C., $\lambda_{max.}^{EtOH}$ 220 mμ and 321 mμ

EXAMPLE 33

*Preparation of 6-Formyl-20-Hydroxy-3-Methoxypregna-3,5-Dien-18-Oic Acid (18→20) Lactone*

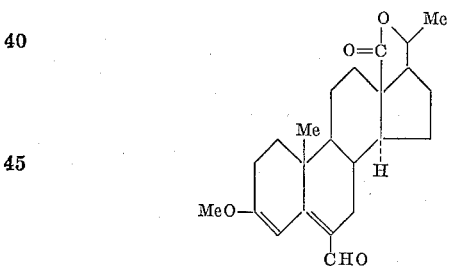

A solution of 20-hydroxy-3-oxopregn-4-en-18-oic acid (18→20) lactone (Labler and Sorm, Chem. and Ind., 1960, 935) (1 g.) trimethylorthoformate (2.5 ml.), methanol (0.1 ml.) and toluene-p-sulphonic acid (0.1 g.) in dry dioxan (25 ml.) was kept at room temperature for ½ hour. Excess acid was neutralised by the addition of pyridine and the mixture was poured into water. The precipitated solid, 20-hydroxy-3-methoxypregna-3,5-dien-18-oic acid (18→20) lactone was collected and dried over $P_2O_5$. It showed $\gamma_{max.}^{Nujol}$ 1750, 1660, and 1627 cm.$^{-1}$ A solution of the foregoing enol ether (1 g.) in dry ethylenedichloride (10 ml.) was added at 0° C. to a stirred suspension of the complex prepared from dimethylformamide (1.1 ml.) and phosgene (0.75 g.) in dry ethylenedichloride (10 ml.) and the mixture was allowed to warm to room temperature over 2 hours. After hydrolysis with aqueous sodium acetate, the product was isolated with ether. Purification by chromatography afforded 6-formyl-20-hydroxy-3-methoxypregna-3,5-dien-18-oic acid (18→20) lactone, having $\gamma_{max.}^{Nujol}$ 1752, 1660, 1620, and 1580 cm.$^{-1}$

EXAMPLE 34

*6-Formyl-Cortisone-17α,21-Diacetate-3-Methyl Enol Ether*

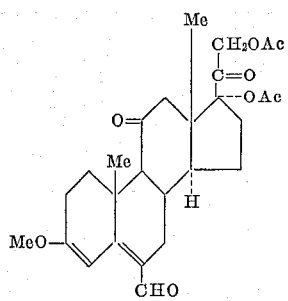

(a) *Cortisone-17α,21-diacetate-3-methyl enol ether.*—Cortisone-17α,21-diacetate (5.7 g.) was dissolved in dioxan (45 ml.) and trimethyl orthoformate (7 ml.), and concentrated sulphuric acid (5 drops) added to the stirred solution. After stirring for 20 minutes, the acid was neutralised with pyridine, and the solution diluted with water. Filtration, and recrystallisation from moist methanol containing a trace of pyridine gave the enol ether, M.P. 160 to 163° C., $[\alpha]_D^{26.5}$ −60° (c., 0.888 in dioxan).

(b) A solution of cortisone-17α,21-diacetate-3-methyl enol ether (5.4 g.) in ethylenedichloride (40 ml. containing a trace of pyridine) was added to the reagent prepared from dimethylformamide (8.5 ml. in 20 ml. ethylenedichloride) and phosgene (20 ml. of a 10% w./v. solution in ethylenedichloride). After stirring for 4 hours, the mixture was poured into methanol (60 ml.) containing water (16 ml.) and sodium acetate (10.0 g.), shaken and extracted with methylene chloride. The extracts were combined, washed with water, dried and evaporated, and the residue recrystallised from moist methanol to give the product, M.P. 198 to 200° C. raised to 203 to 206° C., $[\alpha]_D^{26}$ −73.7 (c., 0.963 in CHCl₃) after further purification from methanol.

EXAMPLE 35

*6-Formyl-3-Methoxy-17β-Acetoxy-19-Nor-Androsta-3,5-Diene*

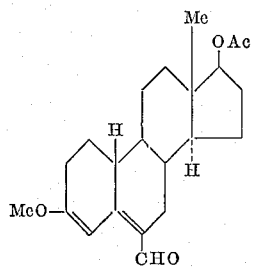

To a solution of dimethylformamide (1.5 g.) in dry ethylenedichloride (6 ml.) at 0° C. was added, slowly, with stirring, a solution of phosgene in ethylenedichloride (10% w./v.: 10.5 ml.). After a further 10 minutes, a solution of 3-methoxy-17β-acetoxy-oestra-2,5(10)-diene (1.5 g.) (U.S. Patent 2,846,452) in ethylenedichloride (7.5 ml.) was added, and the mixture was allowed to warm to room temperature and stirred for a further 3 hours. A solution of sodium acetate (1.5 g.) in water (1.5 ml.) and methanol (15 ml.) was added, and, after 10 minutes, the mixture was extracted with ether. The ether solution was washed with sodium bicarbonate solution and with water, dried over sodium sulphate and evaporated to dryness. The resulting oil solidified on trituration with methanol. Recrystallisation from methanol yielded 6-formyl-3-methoxy-17β-acetoxy-19-nor-androsta-3,5-diene, $\lambda_{max.}$ 219 mμ; 321 mμ, $\gamma_{max.}^{CH_2Cl_2}$ 1731, 1651 and 1608 cm.⁻¹; $\gamma_{max.}^{CS_2}$ 1242, 1211, 1165, 1048, 1029 cm.⁻¹; $\gamma_{max.}^{CCl_4}$ 1739, 1659, 1614, 1386 cm.⁻¹

EXAMPLE 36

*6-Formyl-3-Ethoxy-17β-Acetoxy-19-Nor-Androsta-3,5-Diene*

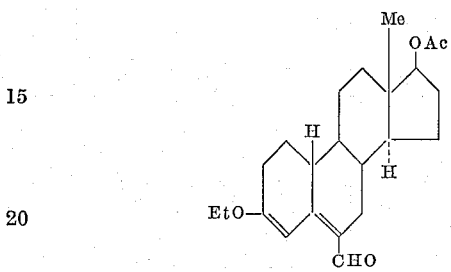

To a solution of dimethylformamide (3.3 ml.) in dry ethylenedichloride (12 ml.) at 0° C., was added, slowly, with stirring, a solution of phosgene in ethylenedichloride (10% w./v.; 22 ml.). After a further 10 minutes, a solution of 19-nor-testosterone acetate 3-ethyl enol ether (A. Ercoli and R. Gardi, J. Amer. Chem. Soc., 1960, 82, 746) (3.0 g.) in ethylenedichloride (20 ml.) was added and the mixture was allowed to warm to room temperature and stirred for a further 3 hours. A solution of sodium acetate (4.5 g.) in water (7.5 ml.) and methanol (30 ml.) was added, and, after 10 minutes the mixture was extracted with ether. The ether solution was washed with sodium bicarbonate solution and water, dried over sodium sulphate and evaporated to give 6-formyl-3-ethoxy-17β-acetoxy-19-nor-androsta-3,5-diene as a gum, $\lambda_{max.}$ 216 to 221 mμ and 320 mμ, $\gamma_{max.}^{CH_2Cl_2}$ 1730, 1651, 1609 cm.⁻¹; $\gamma_{max.}^{CS_2}$ 1242, 1212, 1191, 1166, 1047, 1027, 954, 908, 890, 812, 762, 723, cm.⁻¹;

$\gamma_{max.}^{CCl_4}$ 1740, 1660, 1614, 1478, 1454, 1386, 1375, 1363, 1322, 1294 cm.⁻¹

EXAMPLE 37

*21-Benzylidene-3-Ethoxy-6-Formyl-16α,17α-Isopropylidenedioxypregna-3,5-Dien-20-One*

3 - ethoxy - 16α,17α - isopropylidenedioxypregna - 3,5-dien-20-one (2.0 g.) (prepared as described in Example 1) suspended in ethanol (20 ml.) was treated with benzaldehyde (1 ml.) followed by a solution of sodium (1 g.) in ethanol (40 ml.). The mixture was heated under reflux for 15 minutes during which time the steroid passed into solution. Water was added and the precipitated solid purified from aqueous ethanol containing a trace of pyridine to give 21-benzylidene-3-ethoxy-16α,17α-isopropylidenedioxypregna - 3,5 - dien - 20 - one as yellow plates, M.P. 183 to 190° C. dec., $[\alpha]_D^{20}$ −75° (c., 1.01 in dioxan), $\lambda_{max.}$ 230 (ε 24,330), 240 (ε 20,760) and 297.5 mμ (ε 23,577), $\gamma_{max.}^{Nujol}$ 1675, 1650, 1620, 1590 and 1560 cm.⁻¹

The foregoing compound (3.14 g.) in ethylenedichloride (15 ml.) was added to the formylation mixture prepared from phosgene (22 ml. of 10% solution in ethylenedichloride) and dimethylformamide (3.15 g.) in ethylenedichloride (13 ml.). After being stirred for 2 hours the mixture was poured into a solution of sodium acetate (4.5 g.) in water (7.5 ml.) and methanol (30 ml.). After being stirred for 10 minutes, water was added and the product isolated with ether. The brown gum obtained after removal of the solvents in vacuo was chromatographed on alumina. The fractions eluted with benzene containing 20% ether were purified from ethanol to give 21-benzylidene-3-ethoxy-6-formyl-16α,17α-isopropylidenedioxypregna-3,5-dien-20-one, needles, M.P. 161 to 165° C., $\lambda_{max.}$ 223 to 224 (ε 18,790) and 298 mμ (ε 23,190), $\gamma_{max.}^{CH_2Cl_2}$ 1719, 1675, 1603, and 1575 cm.$^{-1}$

EXAMPLE 38

*17β-Acetoxy-6-Formyl-3-Methoxyandrosta-3,5-Diene*

To a stirred solution of 4 ml. dimethylformamide in 16 ml. of ethylenedichloride was added, over 30 minutes at 0° C., 3.72 g. (5.6 ml.) of oxalyl chloride. When the addition was completed, the reaction mixture was stirred for a further ten minutes and then a solution of 4.0 g. testosterone acetate 3-methyl enol ether in 20 ml. of ethylenedichloride was added and the mixture stirred at room temperature for two hours.

At the end of this time, the reaction mixture was poured into a solution of 6.0 g. anhydrous sodium acetate in 10 ml. of water and 40 ml. of methanol and stirred for 30 minutes. Water was then added and the organic constituent extracted with ether, the ether solution washed with aqueous 10% sodium bicarbonate solution until alkaline and then with water until neutral, dried over sodium sulphate and evaporated. The dark gum so obtained was dissolved in ether and the solution run through a short column of alumina (50 g.). The first fraction (from the first 250 ml. of eluent) yielded a sticky solid on evaporation. Purification from acetone/hexane gave the 6-formyl derivative, identical with the material obtained in Example 10.

EXAMPLE 39

*17α-Chlorethynyl-17β-Formoxy-6-Formyl-3-Methoxyandrosta-3,5-Diene*

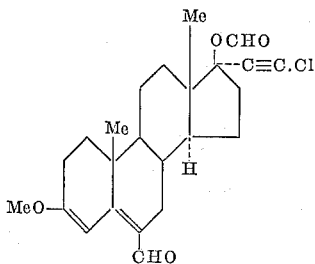

A solution of 17α-chlorethynyl testosterone (prepared as described in our co-pending British patent application No. 27,179/60) (1 g.) in dry dioxan (15 ml.), methanol (1 ml.) and methyl orthoformate, was treated with 3 drops of concentrated sulphuric acid, and the mixture set aside at room temperature for 40 minutes. The product was isolated with ether and crystallised from aqueous methanol containing a trace of pyridine to give 17α-chlorethynyl-17β-hydroxy-3-methoxyandrosta-3,5-diene, plates, M.P. 87 to 90° C., $[\alpha]_D^{25}$ −220° (c., 0.96 in chloroform), $\lambda_{max.}$ 240 mμ (log ε 4.26).

The foregoing compound (2 g.) was added to a stirred, ice-cooled suspension of the formylating reagent [prepared by the addition of a solution of phosgene in ethylenedichloride (12 ml. of 10%) to a solution of dimethylformamide (2.1 ml.) in ethylenedichloride (10 ml.)] containing a trace of pyridine. The mixture was stirred at room temperature for 1½ hours, when a solution of sodium acetate (3 g.) in water (5 ml.) and methanol (20 ml.) was added, and the mixture stirred for a further 10 minutes. Water (100 ml.) was added and the product isolated with ether to give 17α-chlorethynyl-17β-formoxy-6-formyl-3-methoxyandrosta-3,5-diene $\gamma_{max.}^{Nujol}$ 1740, 1660, 1620 and 1580 cm.$^{-1}$

EXAMPLE 40

*16α-Cyano-6-Formyl-3-Methoxypregna-3,5-Dien-20-One*

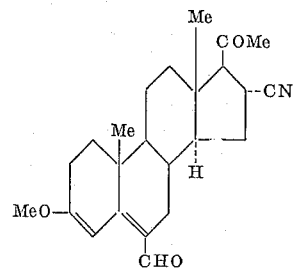

A solution of 16α-cyanoprogesterone (Mazur and Cella, Tetrahedron, 1959, 7, 130) (1 g.) in dry dioxan (15 ml.), methanol (1 ml.) and methyl orthoformate (1 ml.) was treated with 2 drops of concentrated sulphuric acid, and the mixture set aside for 30 minutes. Pyridine (1 ml.) was added, followed by water (60 ml.), and the precipitated solid filtered off and purified from aqueous methanol. 16α-cyano-3-methoxypregna-3,5-dien-20-one separated in needles, M.P. 167 to 169° C., $[\alpha]_D^{24}$ −69° (c., 1.08 in chloroform), $\lambda_{max.}$ 240 mμ (log ε 4.27).

The foregoing compound (1 g.) was added to a stirred ice-cooled suspension of the formylating reagent [prepared by the addition of a solution of phosgene in ethylenedichloride (6 ml. of 10%) to a solution of dimethylformamide (1 ml.) in ethylenedichloride (8 ml.)] containing a trace of pyridine. The mixture was stirred at room temperature for 1½ hours, when a solution of sodium acetate (3 g.) in water (5 ml.) and methanol (20 ml.) was added, and the mixture stirred for a further 10 minutes. Water (60 ml.) was added and the product isolated with ether to give 16α-cyano-6-formyl-3-methoxypregna-3,5-dien-20-one $\gamma_{max.}^{Nujol}$ 1730, 1660, 1625 and 1580 cm.$^{-1}$

EXAMPLE 41

*21-Acetoxy-6-Formyl-11β-Formyloxy-17α-Hydroxy-3-Methoxypregna-3,5-Dien-20-One*

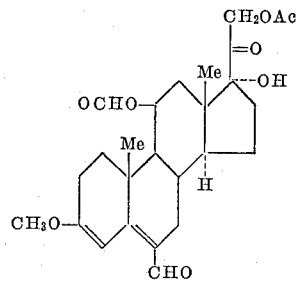

Hydrocortisone 21-acetate-11β-formate (J.A.C.S., 1955, 77, 3564) (25 g.) in [Analar] dioxan (500 ml.) was treated with methyl orthoformate (25 ml.) and toluene-p-sulphonic acid (2.5 g.) for 45 minutes at room temperature. Excess pyridine was added and the product isolated with ether. Crystallisation from methanol containing pyridine gave 21-acetoxy-11β-formyloxy-17α-hydroxy-3-methoxypregna-3,5-dien-20-one, M.P. 185 to 187° C., $[\alpha]_D$ +8° (c., 1.00 in dioxan)

$\lambda_{max.}^{EtOH}$ 240 mμ (ε 19,470)

The foregoing enol ether (3.7 g.) in methylenedichloride (50 ml.) was added to the complex prepared by running a solution of phosgene (4 g.) (10% solution in methylenedichloride) into dimethylformamide (5 ml.) at 0° C. The mixture was stirred for 12 hours and allowed to warm to room temperature. The reaction mixture was poured into aqueous sodium acetate and the product isolated with ether. Crystallisation from methanol gave 21-acetoxy-6-formyl-11β-formyloxy-17α-hydroxy-3- methoxypregna-3,5-dien-20-one, M.P. 210 to 212° C., $[\alpha]_D^{25}$ +16° (c., 1.033 in dioxan)

$\lambda_{max.}^{EtOH}$ 218.5 ($\epsilon$ 11,010) 323 m$\mu$ ($\epsilon$ 15,900)

EXAMPLE 42

*6-Formyl-3-Methoxy-16α,17α-Cyclomethylenepregna-3,5-Dien-20-One*

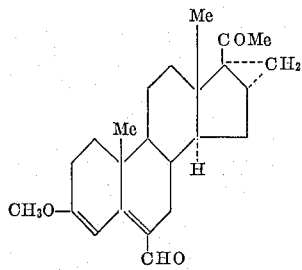

16α,17α - cyclomethylenepregn - 4 - ene - 3,20 - dione (J.A.C.S., 1951, 73, 2383) (7 g.) in dioxan (35 ml.) was stirred at room temperature with methyl orthoformate (7 ml.) and toluene-p-sulphonic acid (0.7 g.). After 15 minutes the product crystallised out. Pyridine was added and water and the product collected by filtration. Crystallisation from methanol containing pyridine gave 3-methoxy-16α,17α - cyclomethylenepregna - 3,5 - dien - 20-one, M.P. 201 to 202° C., $[\alpha]_D^{23}$ —24° (c., 1.04 in dioxan)

$\lambda_{max.}^{EtOH}$ 240 m$\mu$ ($\epsilon$ 19,680)

The foregoing enol ether (3.5 g.) was treated in the usual manner with the complex prepared from phosgene (4 g.) and dimethylformamide (5 ml.) in methylenedichloride. The product was a gum and was chromatographed on alumina (150 g.). Elution with benzene gave 6-formyl-3-methoxy-16α,17α-cyclomethylenepregna-3,5-dien-20-one, prisms from methanol, M.P. 205 to 207° C., $[\alpha]_D$ —53° (c., 0.85 in dioxan)

$\lambda_{max.}^{EtOH}$ 214 to 215 m$\mu$ ($\epsilon$ 12,600), 321 m$\mu$ ($\epsilon$ 15,400)

EXAMPLE 43

*β-[3-Ethoxy-6-Formyl-17β-Hydroxyandrosta-3,5-Dien-17α-yl]-Propionic Acid Lactone*

A solution of β-[3-keto-17β-hydroxyandrost-4-en-17α-yl]-propionic acid lactone (Cella, Brown and Burtner, J. Org. Chem., 1959, 24, 743) (1 g.) in dry dioxan (20 ml.) and ethyl orthoformate (1 ml.) was treated with concentrated sulphuric acid (2 drops) and left at room temperature for 30 minutes. Pyridine (1 ml.) was added, followed by water (50 ml.), and the precipitate collected. Recrystallisation from methylene chloride-methanol containing a trace of pyridine gave β-[3-ethoxy-17β-hydroxyandrosta-3,5-diene-17α-yl]propionic acid lactone as prisms M.P. 174 to 176° C., $[\alpha]_D^{25}$ —171° (c., 1.14 in chloroform $\gamma_{max.}^{Nujol}$ 1760, 1660 and 1630 cm.$^{-1}$ The foregoing enol ether (2 g.) was added to a stirred ice-cooled suspension of the formylating reagent [prepared from a solution of dimethylformamide in ethylenedichlorode (12 ml. 10%) and a solution of phosgene in ethylenedichloride (7 ml. 10%)] and the mixture stirred at room temperature for 45 minutes. The mixture was hydrolysed with aqueous methanolic sodium acetate solution and the product isolated with ether. Crystallisation from ethanol gave β-[3-ethoxy-6-formyl-17β-hydroxyandrosta-3,5-dien-17α-yl] propionic acid lactone as prisms, M.P. 199 to 201° C., $\gamma_{max.}^{Nujol}$ 1760, 1650, 1620 and 1590 cm.$^{-1}$

EXAMPLE 44

*21-Acetoxy-6-Formyl-17α-Hydroxy-3-Methoxypregna-3,5-Diene-11,20-Dione*

The Vilsmeier reagent was prepared at 0° C. from dimethylformamide (25 ml.) in anhydrous methylene chloride (50 ml.) and phosgene (16 g.) in methylene chloride (160 ml.). Cortisone acetate-3-enol methyl ether (25 g.) in methylene chloride (250 ml.) containing pyridine (0.5 ml.) was added and the mixture stirred for 2 hours, when an orange-red precipitate separated. Sodium acetate (30 g.) in water (100 ml.) and methanol (100 ml.) was added and the mixture stirred for 20 minutes then diluted with water and ether (600 ml.). The organic layer was washed with water until the washings were colourless, dried (Na$_2$SO$_4$), stirred with decolourising charcoal, filtered, and the solvents were removed under reduced pressure. The product, purified from aqueous methanol, was 21-acetoxy-6-formyl-17α-hydroxy-3-methoxypregna-3,5-diene-11,20-dione, flakes, M.P. 200 to 204° C., $[\alpha]_D^{27}$ —15° (c., 0.97 in chloroform), $\lambda_{max.}$ 218 ($\epsilon$=10,890) and 322 m$\mu$ ($\epsilon$=14,980); $\gamma_{max.}$ (in CH$_2$Cl$_2$) 1750, 1731, 1705, 1655, 1615 and 1583 cm.$^{-1}$.

EXAMPLE 45

*6-Formyltestololactone 3-Enol Methyl Ether*

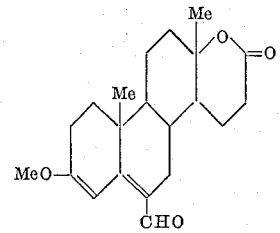

Testololactone was converted into its 3-enol methyl ether by reaction with methyl orthoformate and toluene-p-sulphonic acid in dioxan. The enol ether was obtained as plates from aqueous methanol, M.P. 175 to 183° C., $[\alpha]_D^{26}$ —194° (c., 0.82 in dioxan). The 6-formylation was carried out by the procedure of the previous example to give 6-formyltestololactone 3-enol methyl ether, which separated from aqueous methanol in solvated flakes, $\lambda_{max.}$ 20 ($\epsilon$=10,090) and 320 m$\mu$ ($\epsilon$=15,260) in ethanol.

EXAMPLE 46

*11α,17β-Diacetoxy-6-Formyl-3-Methoxyandrosta-3,5-Diene*

11α,17β-diacetoxyandrost-4-en-3-one (Bernstein et al., J. Org. Chem. 1953, 18, 1166) was converted into its 3-enol methyl ether, $\lambda_{max.}$ 240 m$\mu$ ($\epsilon$=20,280) in ethanol, by reaction with methyl orthoformate and toluene-p-sulphonic acid in dioxan.

The 6-formylation, by the process of Example 44 gave 11α,17β - diacetoxy - 6 - formyl-3-methoxyandrosta-3,5-diene, prisms from aqueous methanol, M.P. 196 to 199° C., $[\alpha]_D^{28}$ —231° (c., 1.01 in chloroform, $\lambda_{max.}$ 219.5 ($\epsilon$=10,420) and 319.5 m$\mu$ ($\epsilon$=14,460) in ethanol, $\gamma_{max.}$ (in CH$_2$Cl$_2$) 1727, 1654, 1619 and 1587 cm.$^{-1}$.

EXAMPLE 47

*6-Formyl Cortisone 17,21-Acetonide 3-Enol Methyl Ether*

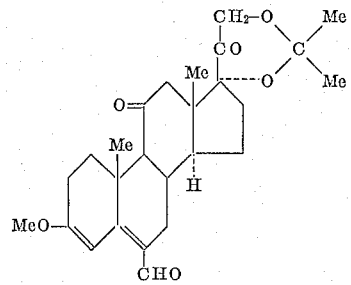

Cortisone (15 g.), dimethylformamide (30 ml.), 2,2-dimethoxypropane (120 ml.) and toluene-p-sulphonic acid (75 mg.) were heated together with slow distillation for 6 hours, during which 40 ml. of distillate was collected. The mixture was cooled to 25 to 30° C. and treated with methyl orthoformate (15 ml.) and methanol (5 ml.) for 10 minutes, then pyridine (2 ml.) was added. The mixture was distilled under reduced pressure to a volume of 45 ml. then water was added until crystallisation began. Purification from ethanol and 1% pyridine gave cortisone 17,21-acetonide 3-enol methyl ether in prisms, M.P. 188 to 196° C., $[\alpha]_D^{26}$ —30.5° (c., 0.83 in dioxan), $\lambda_{max.}$ 238 m$\mu$ ($\epsilon$=20,190) in ethanol.

Formylation by the procedure of Example 44 gave the 6-formyl-derivative, needles from methylene chloride/methanol, M.P. 195 to 199° C., $[\alpha]_D^{26}$ —40° (c., 0.90 in chloroform), $\lambda_{max.}$ 219 ($\epsilon$=12,830) and 320 m$\mu$ ($\epsilon$=15,200) in ethanol, $\gamma_{max.}$ (in $CH_2Cl_2$) 1719, 1703, 1654, 1613 and 1583 cm.$^{-1}$.

EXAMPLE 48

*21-Acetoxy-6-Formyl-3-Methoxypregna-3,5,17(20)-Trien-11-One*

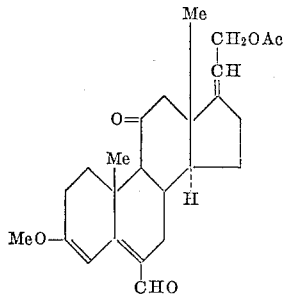

21-acetoxy-3-methoxypregna-3,5,17(20) - trien-11-one was prepared from 21-acetoxypregna-4,17(20)-diene-3,11-dione (Hogg et al., J. Amer. Chem. Soc., 1955, 77, 4436) by reaction with methyl orthoformate and toluene-p-sulphonic acid in dioxan. The 3-methoxy compound separated from aqueous methanol in needles, M.P. 141 to 145° C., $[\alpha]_D^{26}$ —41° (c., 0.78 in dioxan).

6-formylation by the process of Example 44 gave the 6-formyl-derivative, solvated prisms from aqueous methanol, M.P. 80 to 91° C., $[\alpha]_D^{27}$ —107.5° (c., 0.98 in chloroform), $\lambda_{max.}$ below 220 m$\mu$ and 320 m$\mu$ ($\epsilon$=14,000).

EXAMPLE 49

*15α-Acetoxy-6-Formyl-3-Methoxypregna-3,5-Dien-20-One*

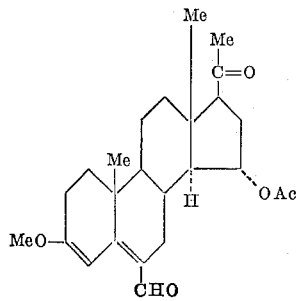

15α acetoxyprogesterone [prepared by acetylation of 15α-hydroxyprogesterone (Gubler and Tamm. Helv. 1958, 41, 301) with acetic anhydride and pyridine] was converted by reaction with methyl orthoformate and toluene-p-sulphonic acid in acetone into its 3-enol methyl ether, M.P. 174 to 176° C., $[\alpha]_D^{25}$ +6° (c., 0.92 in dioxan), $\lambda_{max.}$ 240 m$\mu$ ($\epsilon$ 20,250) in ethanol.

6-formylation oy the process of Example 44 gave 15α-acetoxy-6-formyl-3-methoxypregna-3,5-dien-20-one, $\lambda_{max.}$ 219.5 ($\epsilon$=10,600) and 320 m$\mu$ ($\epsilon$=14,280) in ethanol.

EXAMPLE 50

*17β-Acetoxy-3-Ethoxy-6-Formylandrosta-3,5-Diene*

Testosterone acetate 3-enol ethyl ether treated in the same manner as the methyl enol ether in Example 10, gave 17β - acetoxy-3-ethoxy-6-formylandrosta-3,5-diene, prisms from aqueous ethanol, M.P. 101 to 104° C., $[\alpha]_D^{25}$ —140° (c., 0.81 in chloroform), $\lambda_{max.}$ 220 to 221 m$\mu$ ($\epsilon$=10,710) and 323 m$\mu$ ($\epsilon$=15,890) in ethanol.

EXAMPLE 51

*17β-Acetoxy-3-(β-Ethoxyethoxy)-6-Formylandrosta-3,5-Diene*

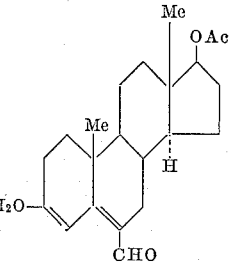

Testosterone acetate 3-enol-β-ethoxyethyl ether, treated in the same manner as the methyl enol ether in Example 10, gave 17β-acetoxy-3-(β-ethoxyethoxy)-6-formylandrosta-3,5-diene, $\lambda_{max.}$ ($\epsilon$=10,500) and 320 m$\mu$ ($\epsilon$=14,120) in ethanol.

EXAMPLE 52

*6-Formyl-16α,17α-Epoxy-3-Methoxypregna-3,5-Dien-20-One*

16α,17α-epoxyprogesterone was treated with methyl orthoformate and toluene-p-sulphonic acid in dioxan to give the 3-enol methyl ether, M.P. 194 to 195° C. from methanol.

The enol ether (20 g.) was added to the complex prepared from dimethylformamide (20 ml.) and phosgene (10 g.) in methylene chloride (200 ml.). After 1 hour sodium acetate (20 g.) in water (200 ml.) was added, the mixture stirred for 20 minutes, ether (400 ml.) added, and the organic layer was washed until the washings were colourless, dried ($Na_2SO_4$) and the solvents removed at 30 to 35° C. under reduced pressure. Potassium hydroxide (5 g.) in methanol (100 ml.) was added and the mixture stirred for ½ hour to reconvert any 16,17-chlorohydrin into the epoxide, then water and ether were added, the ether layer was washed, dried, and evaporated, and the residue was purified from ethanol to give 6-formyl-16α,17α - epoxy - 3 - methoxypregna-3,5-dien-20-one in prisms, M.P. 173 to 176° C., $[\alpha]_D^{25.5}$ —88° (c., 0.93 in dioxan), $\lambda_{max.}$ 216.5 ($\epsilon$=12,080) and 320 m$\mu$ ($\epsilon$=15,635) in ethanol.

EXAMPLE 53

*3-Benzyloxy-6-Formylandrosta-3,5-Dien-17-One*

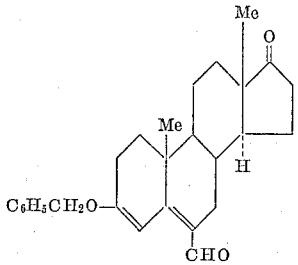

3-benzyloxyandrosta-3,5-dien-17-one [prepared from the 3-ethoxy analogue by distillation with benzyl alcohol, benzene, and toluene-p-sulphonic acid: needles from acetone, M.P. 172 to 176° C., $[\alpha]_D^{26}$ —49° (c., 0.8 in dioxan)] (10 g.) in methylene chloride (50 ml.) treated with the reagent prepared from dimethylformamide (5 ml.) in methylene chloride (20 ml.) and phosgene (3.5 ml.) in methylene chloride (35 ml.). After stirring for 1.5 hours at room temperature potassium bicarbonate (10 g.) in water (100 ml.) was added dropwise with stirring over ½ hour. Ether (150 ml.) was then added and the organic layer was washed, dried ($Na_2SO_4$), decolourised with charcoal, and the solvents removed. Purification from acetone gave 3-benzyloxy-6-formylandrosta-3,5-dien-17-one, needles, M.P. 213 to 216° C., $[\alpha]_D^{26}$ —96° (c., 0.77 in chloroform), $\lambda_{max.}$ 213 ($\epsilon$=16,540) and 322 m$\mu$ ($\epsilon$=16,140).

EXAMPLE 54

6-Formyl-3-Methoxypregna-3,5-Diene-11,20-Dione 11-oxoprogesterone was converted by treatment with methyl orthoformate and toluene-p-sulphonic acid in dioxan into its 3-enol methyl ether, $\lambda_{max.}$ 240 m$\mu$ ($\epsilon$=20,200) in ethanol.

Formylation of the enol ether by the process of Example 44 gave the 6-formyl derivative, $\lambda_{max.}$ 219.5 ($\epsilon$=10,250) and 320.5 m$\mu$ ($\epsilon$=14,140) in ethanol.

EXAMPLE 55

21-Acetoxy-6-Formyl-11β,17α-Dihydroxy-3-Methoxypregna-3,5-Dien-20-One

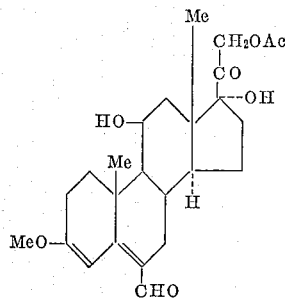

Hydrocortisone acetate (20 g.), anhydrous methanol (40 ml.) methyl orthoformate (40 ml.), tetrahydrofuran (200 ml.) and toluene-p-sulphonic acid (0.4 g.) were stirred together at 28 to 30° C. until a clear solution was obtained (1 hour). Pyridine (2 ml.) was added, and the mixture was poured into ether and water. The ether layer was washed and the solvents removed at 100°/0.5 mm. The residual gum was purified from aqueous methanol+1% pyridine to give hydrocortisone acetate 3-enol methyl ether, prisms, M.P. 170 to 180° C. $[\alpha]_D^{24}$ —15° (c., 1.11 in dioxan), $\lambda_{max.}$ 239.5 m$\mu$ ($\epsilon$=19,540), $\lambda_{max.}$ 1751, 1731, 1658 and 1630 (in $CH_2Cl_2$).

The enol ether (5 g.) was added to the reagent prepared at 0° C. by adding phosgene (2.5 g.) in methylene chloride (25 ml.) to dimethylformamide (4 ml.) in methylene chloride (20 ml.). After stirring for ½ hour at 0° C. the solution was poured into water and sodium acetate (5 g.) and stirred for 10 minutes then the product was extracted with ether. The ethanol solution was washed with water dried ($Na_2SO_4$) and the solvents removed. The residue, in methylene chloride was chromatographed on silica gel (100 g.). Elution with methylene chloride+2% acetone and crystallisation of the product from acetone/hexane gave 21-acetoxy-6-formyl-11β,17α-dihydroxy-3-methoxypregna-3,5-dien-20-one, M.P. 206 to 209° C., $[\alpha]_D^{24}$+16° (c., 0.77 in dioxan), $\lambda_{max.}$ 218 ($\epsilon$=10,630) and 322.5 m$\mu$ ($\epsilon$=15,090), $\gamma_{max.}$ 1750, 1718, 1652, 1614 and 1585 cm.$^{-1}$ (in $CH_2Cl_2$).

EXAMPLE 56

21-Acetoxy-9α-Fluoro-6-Formyl-11β,17α-Dihydroxy-3-Methoxypregna-3,5-Dien-20-One

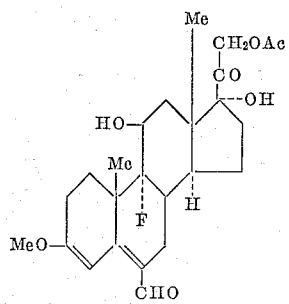

9α-fluorohydrocortisone acetate was converted into its 3-enol methyl ether by treatment with methyl orthoformate and toluene-p-sulphonic acid in dioxan. The enol ether formed fibrous crystals from aqeuous methanol+1% pyridine, $\lambda_{max.}$ 241 m$\mu$ ($\epsilon$=21,000) in ethanol.

The foregoing enol ether (235 mg.) was added to the reagent prepared from dimethylformamide (1 ml.) and phosgene )350 mg.) in methylene chloride (20 ml.), and the mixture stirred for ½ hour. The product isolated by the process of Example 55, was 21-acetoxy-9α-fluoro-6 - formyl - 11β,17α - dihydroxy - 3 - methoxypregna-3,5-dien-20-one, $\lambda_{max.}$ 221 ($\epsilon$=12,170) and 322 m$\mu$ ($\epsilon$=13,750) in ethanol.

EXAMPLE 57

6-Formyl-3-Methoxy-9β,10α-Pregna-3,5-Dien-20-One

A solution of 9β,10α-progesterone (1 g.) (Rec. Trav. Chim. 1960, 79, 771), dry dioxan (20 ml.), methyl orthoformate (2 ml.), methanol (0.25 ml.) and 1% toluene-p-sulphonic acid in dioxan (10 ml.) was kept at room temperature for 1 hour. Pyridine (1 ml.) was added, the mixture was poured into dilute aqueous sodium carbonate and the precipitated steroid was extracted into ether. The residue left on evaporation of the ether was 3-methoxy-9β,10α-pregna-3,5-dien-20-one having $$\gamma_{max.}^{Nujol} \ 1710, \ 1660 \text{ and } 1630 \text{ cm.}^{-1}$$

A solution of the above enol ether (1 g.) in dry ethylenedichloride (10 ml.) was added at 0° C. to a stirred suspension of the complex prepared from dimethylformamide (0.65 g.) and phosgene (0.4 g.) in dry ethylenedichloride (5 ml.) and the mixture was allowed to warm to room temperature over 3 hours. The product was isolated as in Example 4 and was 6-formyl-3-methoxy-9β,10α-pregna-3,5-dien-20-one having $$\gamma_{max.}^{Nujol} \ 1712, \ 1665 \text{ and } 1620 \text{ cm.}^{-1}$$

We claim:

1. 3-enol ethers of 6-formyl-3-oxo-$\Delta^4$ steroids selected from the group consisting of:

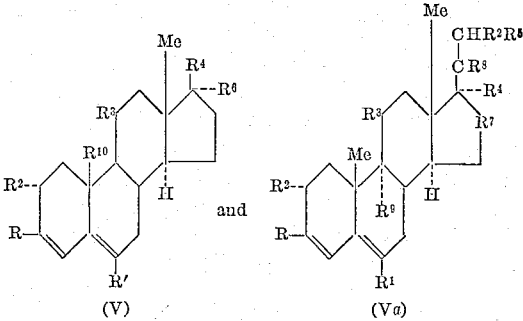

where $R^1$ is CHO, $R^2$ is selected from the group consisting of H and Me, $R^3$ is selected from the group consisting of hydrogen, hydroxy, keto and formoxy, $R^4$ is selected from the group consisting of H, Me, OH and OAcyl (where the acyl group contains up to 10 carbon atoms), $R^5$ is selected from the group consisting of $R^4$ and F, $R^6$ is selected from the group consisting of H, Me, Et, vinyl, ethynyl, propynyl, chlorethynyl and OH, $R^7$ is selected from the group consisting of $CH_2$, $CHR^4$, $C=CH_2$, $C=CHMe$, $CH.CH_2OH$, CHCN and CHHal (where Hal is selected from Cl, Br and F), $R^8$ is selected from the group consisting of keto, H(OH) and H(OAcyl), $R^9$ is selected from the group consisting of H and F, $R^{10}$ is selected from the group consisting of H and Me, and R represents part of an enol ether moiety; compounds of the Formula V wherein R, $R^1$, $R^2$, $R^3$ and $R^{10}$ have the meaning defined above, and $R^4$ and $R^6$ together provide a member selected from the group consisting of =O, =CHCH₂OAc and

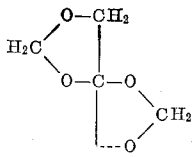

compounds of the formula Va wherein R, R¹, R², R³, R⁵, R⁸ and R⁹ have the meaning defined above and R⁴ and R⁷ together form a radical selected from the group consisting of

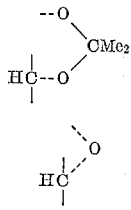

and

compounds of the formula Va wherein R, R¹, R², R³, R⁷, R⁸ and R⁹ have the meaning defined above and wherein R⁴ and R⁵ together form a member selected from the group consisting of

and

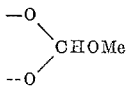

and the 9(11)-dehydro derivatives of the compounds defined above.

2. 21 - acetoxy - 6 - formyl - 17α - hydroxy - 3 -methoxypregna-3,5-diene-11,20-dione.
3. 21 - acetoxy - 11β-formoxy - 6 - formyl - 17α - hydroxy-3-methoxypregna-3,5-dien-20-one.
4. 21 - acetoxy - 11β - hydroxy - 6 - formyl - 17α - hydroxy-3-methoxypregna-3,5-dien-20-one.
5. 17α,21 - diacetoxy - 6 - formyl - 3 - methoxypregna-3,5-dien-11,20-dione.
6. 21 - acetoxy - 3 - ethoxy - 6 - formyl - 17α - hydroxypregna-3,5-diene-11,20-dione.
7. 3 - methoxy - 6 - formyl - 17α,21 - methoxymethylenedioxypregna-3,5-diene-11,20-dione.
8. 6 - formylcortisone - 17,21 - acetonide - 3 - enol methyl ether.
9. 17α,20,20,21 - bismethylenedioxy - 3 - ethoxy - 6-formylpregna-3,5-dien-11-one.
10. 21 - acetoxy - 17α - hydroxy - 3 - methoxy - 6-formylpregna-3,5,9(11)-trien-20-one.
11. 21 - acetoxy - 6 - formyl - 3 - methoxypregna-3,5,17(20)-trien-11-one.
12. 17α - acetoxy - 21 - fluoro - 6 - formyl - 3 -methoxypregna-3,5-dien-20-one.
13. 17α - acetoxy - 6 - formyl - 3 - methoxy - 16α-methylpregna-3,5-dien-20-one.
14. 17α - acetoxy - 6 - formyl - 3 - methoxy - 16-methylenepregna-3,5-dien-20-one.
15. 17α - acetoxy - 6 - formyl - 3 - methoxypregna-3,5-dien-20-one.
16. 6 - formyl - 3 - methoxy - 16α,17α - cyclomethylenepregna-3,5-dien-20-one.

17. 3 - ethoxy - 6 - formyl - 16α,17α - isopropylidenedioxypregna-3,5-dien-20-one.
18. 17β - acetoxy - 3 - methoxy - 6 - formylandrosta - 3,5-diene.
19. 17β - acetoxy - 3 - methoxy - 6 - formyl - 19 - norandrosta-3,5-diene.
20. 6-formyltestololactone 3-enol methyl ether.
21. 6-formyl-3-methoxyandrosta-3,5-dien-17-one.
22. 3-ethoxy-6-formylspirosta-3,5-diene.
23. 21 - acetoxy - 3 - methoxy - 6 - formylpregna - 3,5-dien-20-one.
24. 6 - formyl - 3 - methoxypregna - 3,5 - dien - 20-one.
25. β - [3 - ethoxy - 6 - formyl - 17β - hydroxyandrosta-3,5-dien-17α-yl] propionic acid lactone.
26. A process for converting a 3-enol ether of a 3-oxo-Δ⁴-steroid, unsubstituted in positions 4 and 6, into a corresponding 6-formyl derivative, comprising: treating the said 3-enol ether with a Vilsmeier reagent, under anhydrous conditions, to provide a corresponding 6-iminium intermediate, and hydrolyzing said 6-iminium intermediate to provide said 6-formyl derivative.
27. A process for converting a 3-enol ether of a 3-oxo-Δ⁴-steroid into a corresponding 6-formyl derivative having in rings A and B the following structure:

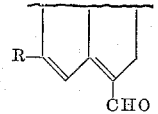

where R is selected from the group consisting of O-alkyl, O-hydroxyalkyl, O-cycloalkyl, O-alkaryl, and O-alkoxyalkyl, comprising: treating a corresponding 3-enol ether, unsubstituted in positions 4 and 6, under anhydrous conditions with a Vilsmeier reagent, formed by the reaction of a formylated secondary amine and an acid halide with nucleophilic displacement of a halogen ion, to give a corresponding 6-iminium intermediate and subjecting said intermediate to aqueous hydrolysis to decompose the 6-iminium group to a 6-formyl group.
28. A process as claimed in claim 26 wherein the 3-enol ether steroid starting material is reacted with the Vilsmeier reagent under anhydrous conditions at a temperature not substantially above room temperature and the resulting iminium intermediate is converted into the required formyl derivative by reaction with a reagent selected from the group consisting of aqueous sodium acetate and aqueous methanolic sodium acetate.
29. A process as claimed in claim 26 wherein the Vilsmeier reagent is a complex formed from dimethyl formamide and a compound selected from the group consisting of phosphorus oxychloride and phosgene.
30. A process as claimed in claim 29 wherein a 3-enol ether steroid starting material in ethylene dichloride and dimethylformamide at 0° C. is treated with a solution of phosgene in ethylenedichloride.
31. A process as claimed in claim 30 wherein the 3-enol ether steroid starting material in dimethylformamide with or without ethylenedichloride is treated with phosphorus oxychloride at 0° C.
32. A process as claimed in claim 26 wherein the Vilsmeier reagent is prepared by treating a stirred mixture of dimethylformamide and ethylenedichloride at 0° C. with phosgene in ethylenedichloride with exclusion of moisture.
33. A process as claimed in claim 29 wherein 1.0 molar proportion of the 3-enol ether steroid starting material are employed and at least 1.1 molar proportion of phosgene and dimethylformamide.

No references cited.